US012551368B2

(12) United States Patent
Saim et al.

(10) Patent No.: US 12,551,368 B2
(45) Date of Patent: Feb. 17, 2026

(54) BIOERODIBLE OCULAR DRUG DELIVERY INSERT AND THERAPEUTIC METHOD

(71) Applicant: EyePoint Pharmaceuticals, Inc., Watertown, MA (US)

(72) Inventors: Said Saim, Watertown, MA (US); Michelle Howard-Sparks, Watertown, MA (US); Dario Paggiarino, Watertown, MA (US); Basel Karzoun, Watertown, MA (US); Jianbing Chen, Watertown, MA (US)

(73) Assignee: EyePoint Pharmaceuticals, Inc., Watertown, MA (US)

( * ) Notice: Subject to any disclaimer, the term of this patent is extended or adjusted under 35 U.S.C. 154(b) by 581 days.

(21) Appl. No.: 17/671,060

(22) Filed: Feb. 14, 2022

(65) Prior Publication Data

US 2022/0168142 A1 Jun. 2, 2022

Related U.S. Application Data

(63) Continuation-in-part of application No. PCT/US2021/050085, filed on Sep. 13, 2021.

(60) Provisional application No. 63/190,052, filed on May 18, 2021, provisional application No. 63/176,430, filed on Apr. 19, 2021, provisional application No. 63/078,265, filed on Sep. 14, 2020.

(51) Int. Cl.
*A61F 9/00* (2006.01)
*A61K 9/00* (2006.01)
*A61P 27/02* (2006.01)

(52) U.S. Cl.
CPC .......... *A61F 9/0017* (2013.01); *A61K 9/0004* (2013.01); *A61K 9/0051* (2013.01); *A61P 27/02* (2018.01); *A61F 2210/0004* (2013.01); *A61F 2210/0076* (2013.01)

(58) Field of Classification Search
CPC ............ A61F 9/0017; A61F 2210/0004; A61F 2210/0076; A61P 27/02; A61K 9/0004; A61K 9/0051
See application file for complete search history.

(56) References Cited

U.S. PATENT DOCUMENTS

| | | | |
|---|---|---|---|
| 6,713,081 B2 * | 3/2004 | Robinson | A61K 9/5026 424/428 |
| 6,891,044 B2 | 5/2005 | Kania et al. | |
| 7,622,593 B2 | 11/2009 | Gray et al. | |
| 7,683,057 B2 | 3/2010 | Liang et al. | |
| 8,039,470 B2 | 10/2011 | Liang et al. | |
| 8,524,709 B2 | 9/2013 | Liang et al. | |
| 8,791,140 B2 | 7/2014 | Campeta et al. | |
| 8,871,241 B2 | 10/2014 | Chou et al. | |
| 10,420,724 B2 | 9/2019 | Jarrett et al. | |
| 2008/0063687 A1 | 3/2008 | Chou et al. | |
| 2014/0303544 A1 | 10/2014 | Haffner et al. | |
| 2015/0030588 A1 | 1/2015 | Jessen et al. | |
| 2015/0133878 A1 | 5/2015 | de Juan, Jr. et al. | |
| 2016/0317438 A1 | 11/2016 | Ashton | |
| 2018/0296525 A1 | 10/2018 | Roizman et al. | |
| 2018/0353431 A1 | 12/2018 | Guo et al. | |
| 2019/0046434 A1 * | 2/2019 | Mota Leite Machado Mariz ....... A61P 27/02 |
| 2019/0233403 A1 | 8/2019 | Liang et al. | |

FOREIGN PATENT DOCUMENTS

| | | |
|---|---|---|
| CN | 110730655 A | 1/2020 |
| WO | 2004066980 A2 | 8/2004 |
| WO | 2011079232 A1 | 6/2011 |
| WO | 2018059556 A1 | 4/2018 |
| WO | 2019202603 A1 | 10/2019 |
| WO | WO-2020177678 A1 * | 9/2020 |

OTHER PUBLICATIONS

Khanani et al., "Sustained-release Tyrosine Kinase Inhibitors for the Treatment of nAMD," Retinal Physician 19:23-25, 30-32 (2022).
Bendell et al., "Phase I, First-in-Human, Dose-Escalation Study to Evaluate the Safety, Tolerability, and Pharmacokinetics of Vorolanib in Patients with Advanced Solid Tumors," Oncologist, 24(4):455-e121 (2019).
Byron et al., "Effects of heat treatment on the permeability of polyvinyl alcohol films to a hydrophilic solute," Journal of Pharmaceutical Sciences, 76(1):65-67 (1987).
Clinical Trials Identifier: NCT01674569, "Pilot Study of X-82 in Patients With Wet AMD," Actual Study Completion Date: Feb. 2015; Tyrogenex.
Clinical Trials Identifier: NCT02348359, "X-82 to Treat Age-related Macular Degeneration," Actual Study Completion Date: Jan. 12, 2018; Tyrogenex.
Clinical Trials Identifier: NCT02452385, "Phase 1 Study of CM082 in Patients With wAMD," Estimated Study Completion Date: Jun. 2020; AnewPharma.
Clinical Trials Identifier: NCT03710863, "Safety and Tolerability of Oral CM082 in Patients With wAMD," Estimated Study Completion Date: Jan. 1, 2022; AnewPharma.
Cohen et al., "APEX: a phase II randomised clinical trial evaluating the safety and preliminary efficacy of oral X-82 to treat exudative age-related macular degeneration," British Journal of Ophthalmology, 105(5):716-722 (2021).
Duker J., "8-month Results of a Tyrosine Kinase Inhibitor (Vorolanib) in a Bio-erodible Durasert Implant for Previously Treated Wet AMD: The DAVIO Trial," U.S. Securities and Exchange Commission, Feb. 2022 <https://www.sec.gov/Archives/edgar/data/0001314102/000156459022004855/eypt-ex991_8.htm>.
"EyePoint, Equinox enter licensing agreement for vorolanib," Ocular Surgery News, Feb. 4, 2020 <https://www.healio.com/news/ophthalmology/20200204/eyepoint-equinox-enter-licensing-agreement-for-vorolanib>.

(Continued)

*Primary Examiner* — Zohreh A Fay
(74) *Attorney, Agent, or Firm* — MEDLER FERRO WOODHOUSE & MILLS PLLC

(57) ABSTRACT

This invention relates to implantable bioerodible inserts for delivering an active pharmaceutical ingredient to the eye. The invention also relates to methods of treatment using such inserts as well as methods of manufacturing such inserts.

14 Claims, 12 Drawing Sheets

(56) References Cited

OTHER PUBLICATIONS

EyePoint Pharmaceuticals, Inc. "Investor Presentation," U.S. Securities and Exchange Commission, Feb. 2020, Exhibit 99.1 <https://www.sec.gov/Archives/edgar/data/0001314102/000156459020005550/eypt-ex991_6.htm>.
EyePoint Pharmaceuticals, Inc. "Cantor Virtual Healthcare Conference," U.S. Securities and Exchange Commission, Sep. 15, 2020, Exhibit 99.1 <https://www.sec.gov/Archives/edgar/data/0001314102/000156459020043596/eypt-ex991_7.htm>.
EyePoint Pharmaceuticals, Inc. "Investor Presentation: Delivering Innovation to the Eye," U.S. Securities and Exchange Commission, Jun. 2021, Exhibit 99.1 <https://www.sec.gov/Archives/edgar/data/0001314102/000156459021031268/eypt-ex991_201.htm>.
EyePoint Pharmaceuticals, Inc. "Investor Presentation: Delivering Innovation to the Eye," U.S. Securities and Exchange Commission, Aug. 2021, Exhibit 99.1 <https://www.sec.gov/Archives/edgar/data/0001314102/000156459021044907/eypt-ex991_7.htm>.
EyePoint Pharmaceuticals, Inc. "EYP-1901 Davio Study Interim Results: Delivering Innovation to the Eye," U.S. Securities and Exchange Commission, Nov. 13, 2021, Exhibit 99.2 <https://www.sec.gov/Archives/edgar/data/0001314102/000156459021056801/eypt-ex992_168.htm>.
EyePoint Pharmaceuticals, Inc. "Investor Presentation: Delivering Innovation to the Eye," U.S. Securities and Exchange Commission, Jan. 2022, Exhibit 99.1 <https://www.sec.gov/Archives/edgar/data/0001314102/000156459022001115/eypt-ex991_8.htm>.
EyePoint Pharmaceuticals, Inc. "Investor Presentation: Delivering Innovation to the Eye," U.S. Securities and Exchange Commission, Jan. 2022, Exhibit 99.2 <https://www.sec.gov/Archives/edgar/data/0001314102/000156459022000775/eypt-ex992_1635.htm>.
EyePoint Pharmaceuticals, Inc. "Investor Presentation: Delivering Innovation to the Eye," U.S. Securities and Exchange Commission, May 2022, Exhibit 99.1 <https://www.sec.gov/Archives/edgar/data/1314102/000156459022020081/eypt-ex991_95.htm>.
EyePoint Pharmaceuticals, Inc. "Investor Day 2022," U.S. Securities and Exchange Commission, Jul. 18, 2022, Exhibit 99.2 <https://www.sec.gov/Archives/edgar/data/1314102/000095017022012766/eypt-ex99_2.htm>.
EyePoint Pharmaceuticals, Inc. "EyePoint Pharmaceuticals Reports Positive Interim Safety and Efficacy Data from Phase 1 DAVIO Clinical Trial Evaluating EYP-1901 for the Treatment of Wet AMD," Form 8-K, Nov. 13, 2021.
Gohil et al., "Studies On The Crosslinking of Poly (Vinyl Alcohol)," Journal of Polymer Research, 13:161-169 (2006).
Hainsworth et al., "Intravitreal delivery of ciprofloxacin," Journal of Ocular Pharmacology and Therapeutics, 12(2):183-191 (1996).
Jackson et al., "Oral Tyrosine Kinase Inhibitor for Neovascular Age-Related Macular Degeneration: A Phase 1 Dose-Escalation Study," JAMA Ophthalmology, 135(7):761-767 (2017).
Jain et al., "Biodegradable hybrid polymeric membranes for ocular drug delivery," Acta Biomaterialia, 6(4):1370-1379 (2010).
Kurek E., "Oral Drug X-82 Shows Promise for Wet Age-Related Macular Degeneration," HCP Live, Jul. 10, 2017 <https://www.hcplive.com/view/oral-drug-x82-shows-promise-for-wet-agerelated-macular-degeneration>.
Lee et al., "Influence of drug release rate on systemic timolol absorption from polymeric ocular inserts in the pigmented rabbit," Journal of Ocular Pharmacology and Therapeutics, 10(2):421-429 (1994).
Makuuchi K. "Progress in radiation vulcanization of natural rubber latex," International Nuclear Information System, 32(5):32-37 (2000).
Peppas et al., "Ultrapure poly(vinyl alcohol) hydrogels with mucoadhesive drug delivery characteristics," European Journal of Pharmaceutics and Biopharmaceutics, 43(1):51-58 (1997).
Wan et al., "Drug release from heat-treated polyvinyl alcohol films," Drug Development and Industrial Pharmacy, 18(17):1895-1906 (1992).
Yang et al., "Reservoir-based polymer drug delivery systems," Journal of Laboratory Automation, 17(1):50-58 (2012).
Liang et al., "Vorolanib, a novel tyrosine receptor kinase receptor inhibitor with potent preclinical anti-angiogenic and anti-tumor activity," Molecular Therapy Oncolytics, 24:577-584 (2022).
Mallapragada et al., "Dissolution mechanism of semicrystalline poly(vinyl alcohol) in water," Polymer Physics, 34(7):1339-1346 (1996).
Peppas et al., "Semicrystalline poly(vinyl alcohol) films and their blends with poly(acrylic acid) and poly(ethylene glycol) for drug delivery applications," Journal of Drug Delivery Science and Technology, 14(4):291-297 (2004).
Abolian A., "Assessing Current Clinical Developments in Ophthalmic AAV Vector Gene Therapies Delivered by Subretinal & Suprachoroidal Injection," Next Generation Drug Delivery Summit, Jan. 2023.
Ali F., "Real World Use of Faricimab : An Iris Registry Analysis," Hawaiian Eye 2023, 2023.
Boyer et al., "The DAVIO Trial, Durasert and Vorolanib in Ophthalmology, Phase 1 Study Interim Results with EYP-1901," American Academy of Ophthalmology (AAO) 2021 Annual Meeting, Nov. 2021.
Creel J., "Investigating Subretinal Delivery via Suprachoroidal Cannulation," Gyroscope Therapeutics, Jan. 26, 2023.
Duker J., "8 month Results of a Tyrosine Kinase Inhibitor (Vorolanib) in a Bio erodible Durasert® Implant for Previously Treated Wet AMD: The DAVIO Trial," Angiogenesis, 2022.
Grisham R., "Development of Intravitreal Vector Delivery Modality for Gene Therapy as a New Standard of Care for Ocular Diseases," Adverum, Jan. 2023.
Gune S., "Port Delivery System With Ranibizumab," Next Generation Ophthalmic Drug Delivery Summit, Jan. 2023.
Hershberger et al., "Initial Safety Results of the DAVIO Trial: An Open Label, Dose Escalation Phase 1 Study of EYP-1901, a Tyrosine Kinase Inhibitor (TKI) in Subjects with Wet AMD," ASRS, 2021.
Jayagopal A., "Optimizing Subretinal Delivery of Gene Therapies," OPUS Genetics, Jan. 2023.
Kaiser P., "New Treatments for AMD Panel," AMD Treatment Update, 2023.
Patel et al., "EYP-1901: Open-label, Dose-Escalation Study Demonstrating Reduced Wet AMD Treatment Burden With Sustained TKI Inhibition—The DAVIO Trial," Retina Society, 2022.
Regillo C., "Port Delivery System Long term Portal Extension Data: Three Year Follow up From the Phase 3 Archway Study," Hawaiian Eye, Jan. 2023.
Saim S., "Exploring Zero-Order Release intraocular Formulations to Achieve Robust Sustained Efficacy," Next Generation Ophthalmic Delivery Summit in San Francisco, Jan. 2023.
Savinainen A., "Ocular Distribution and Exposure of Belzupacap Sarotalocan Following Intravitreal or Suprachoroidal Administration," Next Generation Ophthalmic Drug Delivery Summit, Jan. 2023.
Singh R., "12-Month Results of a Tyrosine Kinase Inhibitor (Vorolanib) in a Bioerodible Durasert® Insert for Previously Treated Neovascular AMD: The DAVIO Trial," ASRS Annual Meeting—nAMD 2 Symposium, Jul. 2022.
Singh R., "Targeting the Complement Cascade to Mitigate the Progression of Geographic Atrophy Secondary to AMD," Retina 2023 CME Seminar, Jan. 2023.
Stewart M., "Optimizing Clinical Trial Design to Deliver Desired Ocular Therapeutic Efficacy Duration," Mayo Clinic Florida.
Zilliox P., "Non-viral Gene Therapy Platform for the Treatment of Ocular Diseases," EyeVensys, Jan. 2023.
Blizzard et al., "Polymers for Retinal Drug Delivery," Retinal Physician 20:28-31 (2023).
EyePoint Pharmaceuticals, Inc. "Investor Presentation," Sep. 28, 2022.
Ren et al., "The Effect of CM082, an Oral Tyrosine Kinase Inhibitor, on Experimental Choroidal Neovascularization in Rats," J Ophthalmol. 2017:6145651 (2017).
Mashkovky M. D., "Drugs," Physicians' Guide 14$^{th}$ edition, vol. 1. pp. 8-9, Moscow (2002).

* cited by examiner

BIOERODIBLE OCULAR DRUG DELIVERY INSERT AND THERAPEUTIC METHOD

CROSS-REFERENCE TO RELATED APPLICATIONS

The present application is a continuation-in-part of International Patent Application No. PCT/US21/50085, filed Sep. 13, 2021, which claims benefit of U.S. Nonprovisional Patent Application Nos. 63/190,052, filed May 18, 2021; 63/176,430, filed Apr. 19, 2021; and 63/078,265, filed Sep. 14, 2020, the disclosures of each of which are incorporated by reference herein in their entireties.

BACKGROUND OF THE INVENTION

Field of the Invention

This invention relates to implantable bioerodible inserts for delivering active pharmaceutical agents to the eye. The invention also relates to methods of using such inserts to treat patients in need of therapeutic relief, as well as methods of manufacturing such inserts.

Background

Implantable drug delivery inserts possess certain advantages over conventional drug delivery methods, such as oral administration or intravenous injection. For example, in conventional dosing methods the concentration of a drug (active pharmaceutical ingredient) may vary considerably, reaching a maximum concentration ($C_{max}$) shortly after administration and decreasing sharply afterwards. To maintain therapeutic levels, it may be necessary to administer the drug at high dosages, which could result temporarily in high drug concentrations that are potentially toxic. As the drug is metabolized or eliminated by the body, the drug concentration may decrease to safe and therapeutic levels. When the drug level falls to sub-therapeutic levels, another dose must be administered, and the cycle is thus repeated. Thus, a problem with conventional dosing is that, for certain types of drugs, a patient may be chronically exposed to undesirably high levels of the drug from the repeated dosing cycles required for treatment. In addition, frequent dosing may be required, reducing patient compliance.

Implantable drug delivery inserts may reduce the need for frequent dosing and avoid high systemic concentrations of the drug. However, achieving a constant dosing rate (so called zero-order release) for an acceptable duration is challenging.

In addition, many implantable drug delivery inserts contain non-biodegradable materials that permanently remain in a patient's body even after all of the drug has been administered. This may become problematic, particularly for drug delivery to an anatomical location with a small volume. Repeated therapeutic treatments by implantation may be limited due to the undesirable accumulation of the non-biodegradable portions of the implantable drug delivery device.

In addition, providing an implantable drug delivery device of a size that is small enough to implant in a patient with minimal discomfort, yet large enough to contain sufficient drug to provide sustained delivery of therapeutic levels of the drug is extremely challenging.

In view of these factors, there remains a need in the art for improving the design and the method of preparing implantable drug delivery devices that provide controlled and sustained release of a drug to a patient to obtain a desired local or systemic physiological or pharmacological effect.

One ophthalmic condition for which there is a need for improved drug delivery is age-related macular degeneration ("AMD"). AMD is a leading cause of blindness worldwide, and the World Health Organization estimates that about 14 million people are blind or severely impaired because of AMD. AMD causes the progressive loss of central vision attributable to degenerative and neovascular changes in the macula, a specialized area in the center of the retina. In general, macular degeneration can produce a slow or sudden loss of vision.

Two forms of AMD exist: dry AMD and wet AMD. Typically, AMD begins as dry AMD, which is characterized by the formation of drusen, yellow plaque-like deposits in the macula between the retinal pigment epithelium and the underlying choroid. About 15% of dry AMD patients develop wet AMD, which is characterized by the formation of new blood vessels in the choroid (choroidal neovascularization) and vision loss.

Dry macular degeneration is more common than wet AMD, with about 90% of AMD patients being diagnosed with dry AMD. The dry form of AMD may result from the aging and thinning of macular tissues, depositing of pigment in the macula, or a combination of the two processes. The wet form of the disease usually leads to more serious vision loss. With wet AMD, new blood vessels grow beneath the retina and leak blood and fluid. This leakage causes retinal cells to die and creates blind spots in central vision.

While there is no cure for AMD, some treatments for wet AMD exist, but many of them are inconvenient or have significant adverse effects.

BRIEF SUMMARY OF THE INVENTION

In accordance with various embodiments of the invention and after extensive experimentation, the inventors have invented a novel bioerodible drug delivery insert comprising an active pharmaceutical ingredient (API) and a bioerodible polymer. This insert is particularly useful for local delivery of an effective amount of the API to the eye. In addition, the insert provides sustained release of the API. In some aspects the insert provides sustained release of for a period that is nearly synchronized with the period required for complete erosion of the insert in an eye.

These inserts may be administered intraocularly, e.g., by intravitreally, suprachoroidally, and intracamerally; or subconjunctivally. For example, the inserts may be placed through a needle or cannula, e.g., intravitreal injection. Thus, in some aspects, the invention relates to a drug delivery insert that can deliver effective intraocular concentrations of the API while delivering low systemic concentrations of the API, e.g., to reduce the risk of toxicity or other undesirable side effects.

In some aspects, the invention relates to methods for treating or preventing ocular diseases by local (e.g., intraocular) administration of an API or a pharmaceutically acceptable salt thereof.

In one embodiment, the invention relates to an ocular drug delivery insert comprising a solid matrix core comprising a matrix polymer and vorolanib or a pharmaceutically acceptable salt thereof, wherein the amount of the vorolanib or pharmaceutically acceptable salt thereof in the insert is about 10% w/w to about 98% w/w, wherein the drug release rate for the insert is about 0.01 µg/day to about 100 µg/day for at least 14 days and wherein the insert is capable of at least 20% erosion within 95 days. In another embodiment, the amount of the vorolanib or pharmaceutically acceptable salt thereof in the insert is about 60% w/w to about 98% w/w.

In another embodiment, the insert further comprises a coating substantially surrounding the core. In some embodiments, the amount of coating is about 5% w/w to about 20% w/w of the insert. In additional embodiments, the insert further comprises a delivery port.

In another embodiment, the insert is sized and shaped to fit through a 20 to 27 gauge needle or cannula and the insert has a length of about 1 mm to about 10 mm. In yet another embodiment, the insert is sized and shaped to fit through a needle or cannula smaller than 25 gauge. In a further embodiment, the insert has a length of about 1 mm to about 6 mm.

In some embodiments, the matrix polymer comprises PVA. In some embodiments, the matrix polymer consists of PVA. In some embodiments, the coating comprises PVA. In some embodiments, the coating consists of PVA.

In some aspects, the coating comprises a different grade of PVA than the matrix polymer. In some embodiments the coating comprises more than one coat comprising PVA, and the DH of the PVA in at least one coat differs from the DH of the matrix polymer PVA. In some embodiments, the MW of the PVA in the coating differs from the MW of the matrix polymer PVA. In further embodiments, the coating comprises at least two coats comprising PVA, and at least one of the coats comprises a different grade of PVA from at least one other coat. In yet other aspects, the PVA in at least two coats comprising PVA differ in DH. In some embodiments of the insert, the PVA in at least two coats comprising PVA differ in MW.

In yet another embodiment, the insert is capable of at least 90% erosion within 440 days.

In one aspect of the insert, the drug release rate is about 0.1 μg/day to about 20 μg/day. In another aspect of the insert, the drug release rate is about 0.1 μg/day to about 10 μg/day. In yet another aspect of the insert, the drug release rate is about 0.1 μg/day to about 2 μg/day.

In one embodiment, the core comprises about 200 μg to about 2000 μg of vorolanib or a pharmaceutically acceptable salt thereof.

In another embodiment, the duration of release of vorolanib is at least about 90 days. In yet another embodiment, the duration of release of vorolanib is about 60 days to about 270 days.

In one aspect of the invention, the core comprises about 1% w/w to about 15% w/w PVA.

In another aspect of the invention, the insert was cured for about 30 minutes to about 4 hours at about 130° C. to about 150° C.

In yet another aspect of the invention, the insert has approximately zero-order release rate kinetics.

In one embodiment, the insert is cylindrical in shape. In a further embodiment, at least one end of the insert forms a delivery port.

In another embodiment, the insert is made by dissolving PVA in an aqueous solution to form a PVA solution, mixing the PVA solution with vorolanib or a pharmaceutically acceptable salt thereof to form a matrix mixture, extruding the mixture through a dispensing tip to form an elongated shaped matrix, curing the elongated shaped matrix at a temperature of about 140° C. to about 160° C. for about 30 minutes to about 2 hours, and segmenting the elongated shaped matrix.

In other embodiments, the insert is made by dissolving PVA in an aqueous solution to form a PVA solution, mixing the PVA solution with vorolanib or a pharmaceutically acceptable salt thereof to form a matrix mixture, extruding the mixture through a dispensing tip to form an elongated shaped matrix, coating the elongated shaped matrix with a PVA solution, curing the elongated shaped matrix at a temperature of about 140° C. to about 160° C. for about 30 minutes to about 2 hours, and segmenting the elongated shaped matrix.

The invention also relates to a method of treating or preventing a condition of the eye in a subject in need thereof comprising injecting one or more of the insert/s into the vitreous of an eye of the subject.

In addition, the invention relates to a method of treating macular degeneration in a subject in need thereof comprising injecting one or more of the insert/s into the vitreous of an eye of the subject. In some embodiments, the macular degeneration treated is age-related macular degeneration.

In another aspect, the invention provides a method of making an ocular drug delivery insert comprising dissolving PVA in an aqueous solution to form a PVA solution, mixing the PVA solution with vorolanib or a pharmaceutically acceptable salt thereof to form a matrix mixture, extruding the mixture through a dispensing tip to form an elongated shaped matrix, curing the elongated shaped matrix at a temperature of about 140° C. to about 160° C. for about 30 minutes to about 6 hours, and segmenting the elongated shaped matrix.

In another aspect, the elongated shaped matrix is covered with a coating comprising PVA before curing the matrix.

In addition, the invention relates to a method of treating a condition in a subject in need thereof wherein the condition is selected from the group consisting of: macular degeneration, retinal vein occlusion, and diabetic retinopathy comprising administering about 0.01 μg/day to about 100 μg/day of vorolanib directly to an eye of the subject.

In one embodiment, the vorolanib or a pharmaceutically acceptable salt thereof is delivered by injecting one or more ocular drug delivery inserts comprising vorolanib or a pharmaceutically acceptable salt thereof into the eye.

In another embodiment, the insert is administered by intravitreal injection.

In some embodiments, the insert is injected through a needle or cannula smaller than 25 gauge. In some embodiments no incision is required for the injection.

In some aspects, 1-6 inserts are injected.

In some aspects, each of the inserts comprises about 200 μg to about 2000 μg.

In some aspects, the total amount of vorolanib in all of the inserts injected is about 600 μg to about 6000 μg.

In some embodiments, each of the one or more ocular drug delivery inserts has a drug release rate of about 0.1 μg/day to about 100 μg/day for at least 60 days.

In some embodiments, the one or more ocular drug delivery inserts deliver a total average daily dose of vorolanib of about 1 μg/day to about 50 μg/day for at least 30 days.

In other embodiments, the one or more ocular drug delivery inserts deliver a total average daily dose of vorolanib of about 1 μg/day to about 20 μg/day for at least 30 days.

The invention also provides an ocular drug delivery insert consisting of a solid matrix core comprising an API and at least two different grades of PVA, wherein the drug release rate for the insert is about 0.0001 μg/day to about 200 μg/day for at least 30 days, wherein the insert is capable of at least 20% erosion within 95 days, and wherein the insert is sized and shaped to fit through a 20 to 27 gauge needle or cannula.

In some embodiments of this insert, the two different grades of PVA is a mixture selected from the list comprising: a mixture of MW 78,000, 88% hydrolyzed and MW 78,000, 98% hydrolyzed; a mixture of MW 78,000, 88% hydrolyzed and MW 78,000, 99+% hydrolyzed; a mixture of MW 6,000, 80% hydrolyzed and MW 78,000, 98% hydrolyzed; a mixture of MW 6,000, 80% hydrolyzed and MW 78,000, 99+% hydrolyzed; a mixture of MW 78,000, 88% hydrolyzed and MW 125,000, 88% hydrolyzed; and a mixture of MW 6,000, 80% hydrolyzed and MW 125,000, 88% hydrolyzed.

In addition, the invention provides an ocular drug delivery insert comprising (a) a solid matrix core comprising PVA and an API, and (b) a coating comprising PVA substantially surrounding the core; wherein the insert comprises at least two different grades of PVA, wherein the insert is capable of at least 20% erosion within 95 days, and wherein the insert is sized and shaped to fit through a 20 to 27 gauge needle or cannula.

In some embodiments of the insert, the coating comprises a different grade of PVA than the core PVA. In some embodiments, the DH of the PVA in the coating differs from the DH of the core PVA. In other embodiments, the MW of the PVA in the coating differs from the MW of the core PVA. In yet other embodiments, the coating comprises at least two coats comprising PVA, and at least one of the coats comprises a different grade of PVA from at least one other coat. In further embodiments, the PVA in at least two coats differ in DH. In some embodiments, the PVA in at least two coats differ in MW.

In other aspects of the insert, the amount of the API in the insert is about 60% w/w to about 98% w/w. In yet other aspects, the core comprises about 20% w/w to about 60% w/w PVA. In further embodiments, the amount of coating is about 5% w/w to about 20% w/w of the insert. In other embodiments, the insert is capable of at least 90% erosion within 440 days.

In some embodiments, the insert has approximately zero-order release rate kinetics and the drug release rate for the insert is about 0.0001 µg/day to about 200 µg/day for at least 30 days. In yet other embodiments, the drug release rate is about 0.001 µg/day to about 100 µg/day for at least 30 days. In further embodiments, the duration of release of the API is at least about 90 days. In additional embodiments, the duration of release of the API is about 60 days to about 270 days.

In some aspects of the insert, the insert was cured for about 30 minutes to about 4 hours at about 130° C. to about 150° C.

In other aspects, the insert is cylindrical in shape. In another embodiment, at least one end of the insert forms a delivery port. In a further embodiment, the insert has a length of about 1 mm to about 10 mm, or is sized and shaped to fit through a needle or cannula smaller than 25 gauge.

The invention also provides an ocular drug delivery insert comprising:
(a) a solid matrix core comprising a PVA selected from the group consisting of MW 6,000, 80% hydrolyzed, MW 9,000-10,000, 80% hydrolyzed, MW 25,000, 88% hydrolyzed, MW 25,000, 98% hydrolyzed, MW 30,000-70,000, 87-90% hydrolyzed, MW 78,000, 88% hydrolyzed, MW 78,000, 98% hydrolyzed, MW 78,000, 99+% hydrolyzed, MW 89,000-98,000, 99+% hydrolyzed, MW 85,000-124,000, 87-89% hydrolyzed, MW 108,000, 99$^+$% hydrolyzed, MW 125,000, 88% hydrolyzed, MW 133,000, 99% hydrolyzed, MW 146,000-186,000, 99+% hydrolyzed, and mixtures thereof; and an API; and (b) at least one coating comprising PVA substantially surrounding the core, wherein the PVA in the coating is selected from a PVA selected from the group consisting of MW 6,000, 80% hydrolyzed, MW 9,000-10,000, 80% hydrolyzed, MW 25,000, 88% hydrolyzed, MW 25,000, 98% hydrolyzed, MW 30,000-70,000, 87-90% hydrolyzed, MW 78,000, 88% hydrolyzed, MW 78,000, 98% hydrolyzed, MW 78,000, 99+% hydrolyzed, MW 89,000-98,000, 99+% hydrolyzed, MW 85,000-124,000, 87-89% hydrolyzed, MW 108,000, 99$^+$% hydrolyzed, MW 125,000, 88% hydrolyzed, MW 133,000, 99% hydrolyzed, MW 146,000-186,000, 99+% hydrolyzed, and mixtures thereof;

wherein the PVA in the core and the PVA in at least one coating are different grades of PVA.

In some embodiments, the insert comprises at least 2 coats of PVA and the DH of the PVA in the outermost coat is lower than the DH of any of the PVA each of the other coats.

In other embodiments of the inserts of the invention, the API has a molecular weight of 1000 AMU or less and a water solubility of less than about 200 µg/mL at 25° C. In other embodiments, the API is a VEGF inhibitor. In other embodiments, it is a TKI inhibitor. In yet other embodiments, the API is vorolanib or a pharmaceutically acceptable salt thereof. In further embodiments, the API is axitinib or a pharmaceutically acceptable salt thereof. In yet other embodiments, the API is a Tie-2 activator. In some embodiments, the API is razuprotafib or a pharmaceutically acceptable salt or zwitterion thereof.

In some aspects of the methods of the invention, the subject has geographic atrophy, the subject is at risk of developing geographic atrophy, the subject has vision loss, the subject is at risk of developing vision loss, the subject has ischemic retinal vein occlusion, or the subject has non-ischemic retinal vein occlusion.

The invention also provides a method of inhibiting angiogenesis in an eye in a subject in need thereof, comprising implanting in the vitreous of an eye of the subject one or more ocular drug delivery inserts, wherein the number of inserts administered during the administration procedure is from 1 to 6 inserts, and wherein each of the one or more inserts has a drug release rate of about 0.01 µg/day to about 100 µg/day of vorolanib for at least 30 days.

It also provides a method of inhibiting VEGFR and PDGFR in an eye of a subject in need thereof, comprising implanting in the vitreous of an eye of the subject one or more ocular drug delivery inserts, wherein the number of inserts administered during the administration procedure is from 1 to 6 inserts, and wherein each of the one or more inserts has a drug release rate of about 0.01 µg/day to about 100 µg/day of vorolanib for at least 30 days.

In addition, the invention provides a method of treating macular degeneration in a subject in need thereof, comprising implanting in the vitreous of an eye of the subject one or more ocular drug delivery inserts, wherein the number of inserts administered during the administration procedure is from 1 to 6 inserts, and wherein each of the one or more inserts has a drug release rate of about 0.01 µg/day to about 100 µg/day of vorolanib for at least 30 days. In some embodiments, the macular degeneration treated is age-related macular degeneration.

In some embodiments, the methods of treatment or administration further comprise administering a pharmaceutical composition comprising a therapeutically effective amount of a Tie-2 activator to the subject. In a further embodiment, the Tie-2 activator is razuprotafib, or a pharmaceutically acceptable salt or zwitterion thereof. In yet other embodiments, the methods of treatment further comprise administering a pharmaceutical composition comprising a therapeutically effective amount of a steroidal anti-inflammatory agent to the subject.

In addition, the invention provides a method of inhibiting VE-PTP in an eye of a subject in need thereof comprising injecting one or more of the inserts of into the vitreous of an eye of the subject. In other aspects, the invention provides a method of treating glaucoma in a subject in need thereof comprising injecting one or more of the inserts into the vitreous of an eye of the subject. In yet other embodiments, the invention provides a method of treating elevated IOP in a subject in need thereof comprising injecting one or more of the inserts into the vitreous of an eye of the subject. In yet another embodiment, the invention provides a method of reducing IOP in a subject in need thereof comprising injecting one or more of the inserts into the vitreous of an eye of the subject. In some embodiments, the method further comprises administering a VEGF inhibitor.

In some aspects, the invention provides an insert for use in treating or preventing a condition of the eye in a subject in need thereof.

In other aspects, the invention provides an insert for use in inhibiting angiogenesis in an eye in a subject in need thereof.

In yet other aspects, it provides an insert for use in inhibiting VEGFR and PDGFR in an eye of a subject in need thereof.

In some aspects, the invention provides an insert for use in treating age-related macular degeneration in a subject in need thereof.

In some aspects, the invention provides an insert for use in treating retinal vein occlusion in an eye of a subject in need thereof.

In some aspects, the invention provides an insert for use in treating diabetic retinopathy in an eye of a subject in need thereof.

In some embodiments, the invention provides an insert for use in inhibiting VE-PTP in an eye of a subject in need thereof.

In some embodiments, the invention provides an insert for use in treating glaucoma in an eye of a subject in need thereof.

In other embodiments, the invention provides an insert for use in treating elevated IOP in an eye of a subject in need thereof.

In yet other embodiments, the invention provides an insert for use in reducing IOP in an eye of a subject in need thereof.

In additional embodiments, the invention provides an insert for use in treating uveitis in an eye of a subject in need thereof.

In further embodiments, the invention provides an insert for use in treating chronic non-infectious uveitis affecting the posterior segment of the eye in an eye of a subject in need thereof.

In some embodiments, the insert is injected through a needle or cannula smaller than 25 gauge. In some embodiments no incision is required for the injection.

DETAILED DESCRIPTION OF THE INVENTION

1. Active Pharmaceutical Ingredient (API)

Figure 1:
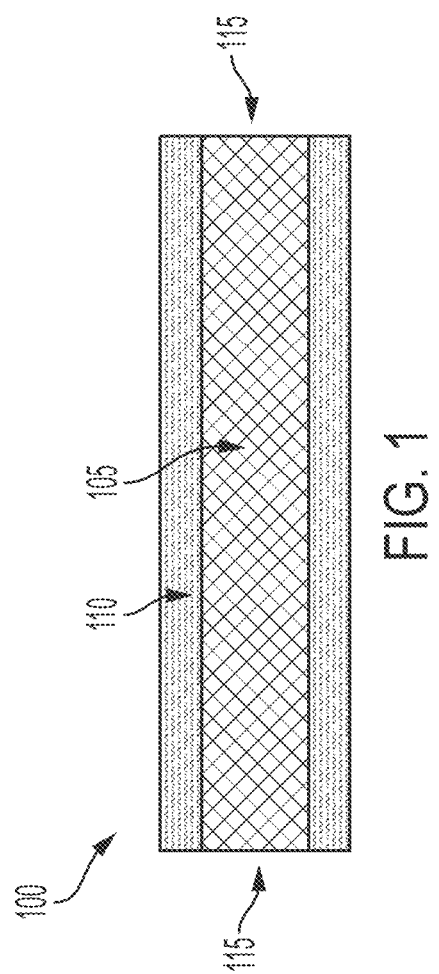
FIG. 1 depicts an exemplary ocular drug delivery insert of the invention.

The insert of the invention comprises an active pharmaceutical ingredient (API). An API is sometimes referred to as a "drug" herein.

In some embodiments, the API for the insert and methods of the invention is an API with a molecular weight of 1000 AMU or less, and a water solubility of less than about 200 μg/mL at 25° C. In other embodiments, the water solubility of the API is less than about 100 μg/mL at 25° C., less than about 75 μg/mL at 25° C., less than about 50 μg/mL at 25° C., less than about 10 μg/mL at 25° C., or less than about 5

µg/mL at 25° C. In some embodiments, the water solubility of the API at 25° C. is about 0.1 µg/mL to about 200 µg/mL, about 0.1 µg/mL to about 150 µg/mL, about 0.1 µg/mL to about 100 µg/mL, about 0.1 µg/mL to about 75 µg/mL, about 0.1 µg/mL to about 50 µg/mL, about 0.1 µg/mL to about 20 µg/mL, about 0.1 µg/mL to about 10 µg/mL, or about 0.5 µg/mL to about 50 µg/mL.

The ocular insert of the present invention may be used to deliver various classes of APIs. Examples of these classes of APIs and of specific APIs include the following:

In some embodiments, the API is a vascular endothelial growth factor (VEGF) inhibitor (also sometimes referred to as an anti-VEGF), a kinase inhibitor such as a tyrosine kinase (TKI) inhibitor, a vascular endothelial protein tyrosine phosphatase (VE-PTP) inhibitor, an Ang-1 inhibitor, an Ang-2 inhibitor, a Tie-2 activator, a Tie-2 agonist, or an mTOR inhibitor. API's having one or more of these activities include altiratinib, rebastinib, afatinib, alectinib, apatinib, ASP-3026, axitinib, bafetinib, baricitinib, binimetinib, bosutinib, brigatinib, cabozantinib, canertinib, cediranib, CEP-11981, CEP-37440, ceritinib, cobimetinib, copanlisib, crenolanib, crizotinib, CYT387, dabrafenib, damnacanthal, dasatinib, doramapimod, enterctinib, erlotinib, everolimus, filgotinib, foretinib, fostamatinib, gefitinib, grandinin, ibrutinib, icotinib, idelalisib, imatinib, IPI-145, JSI-124, lapatinib, lenvatinib, lestaurtinib, linifanib, masitinib, motesanib, mubritinib, neratinib, nilotinib, nintedanib, pacritinib, palbociclib, pazopanib, pegaptanib, perifosine, pexmetinib, PF-06463922, ponatinib, PX-866, quizartinib, radotinib, razuprotafib (AKB-9778), regorafenib, ruxolitinib, selumetinib, semaxanib, sirolimus, sorafenib, sorafenib tosylate, staurosporine, sunitinib, sunitinib malate, SU6656, temsirolimus, TG101348, tivozanib, toceranib, tofacitinib, trametinib, TSR-011, vandetanib, vatalanib, vemurafenib, vorolanib, and X-396.

In some embodiments the API may be a steroidal anti-inflammatory agent such as a steroid or corticosteroid, non-limiting examples of which are fluocinolone acetonide, hydrocortisone, hydrocortisone acetate, triamcinolone acetonide, methylprednisolone, dexamethasone, medrysone, methylprednisolone, prednisolone 21-phosphate, prednisolone acetate, fluorometholone and betamethasone.

In other embodiments, the API is a prostaglandin or a prostaglandin analog or agonist, such as bimatoprost, latanoprost, latanoprostene bunod, tafluprost, or travoprost.

In yet other embodiments, the API is an alpha-2 adrenergic receptor agonist, such as brimonidine, brimonidine tartrate, or brimonidine pamoate.

In some aspects, the API is a beta-blocker such as timolol.

In other aspects, the API is a carbonic anhydrase inhibitor (CAI) such as acetazolamide, brinzolamide, dorzolamide, or methazolamide.

In other aspects, the API is a rho khinase inhibitor such as netarsudil.

Non-steroidal anti-inflammatory drugs (NSAIDs) are also contemplated. NSAIDS include diclofenac, etoldolac, fenoprofen, floctafenine, flurbiprofen, ibuprofen, indoprofen, ketoprofen, ketorolac, lomoxicam, morazone, naproxen, perisoxal, pirprofen, pranoprofen, suprofen, suxibuzone, tropesin, ximoprofen, zaltoprofen, zileuton, and zomepirac. COX-2 inhibitors such as valdecoxib, rofecoxib, and celecoxib are also contemplated.

In some embodiments, the API is a neuroprotectant such as nimodipine; an antibiotic such as tetracycline, chlortetracycline, bacitracin, neomycin, polyrnyxin, gramicidin, oxytetracycline, chloramphenicol, gentamycin, or erythromycin; or an antibacterial such as a sulfonamide, sulfacetamide, sulfamethizole, sulfisoxazole nitrofurazone or sodium propionate.

In another embodiment, the API is a compliment inhibitor, such as a C3 inhibitor, e.g., APL-2 (pegcetacoplan), or a C5 inhibitor.

Anesthetics and analgesic agents such as lidocaine and related compounds are also contemplated.

In some embodiments, the insert comprises more than one API.

In addition, the invention contemplates the use of analogs, derivatives, pharmaceutically acceptable salts, esters, prodrugs, codrugs, and protected forms thereof of the API.

The term "pharmaceutically acceptable salt" of a given compound refers to salts that retain the biological effectiveness and properties of the given compound, and which are not biologically or otherwise undesirable.

Pharmaceutically acceptable salts include salts with inorganic acids or organic acids, and salts with inorganic bases or organic bases. Those skilled in the art will recognize various synthetic methodologies that may be used to prepare nontoxic pharmaceutically acceptable salts.

Salts may be derived from inorganic acids, including hydrochloric acid, hydrobromic acid, sulfuric acid, nitric acid, phosphoric acid, and the like. Salts may be derived from organic acids, including acetic acid, propionic acid, glycolic acid, gluconic acid, pamoic acid, pyruvic acid, oxalic acid, maleic acid, malonic acid, succinic acid, fumaric acid, tartaric acid, citric acid, lactic acid, benzoic acid, cinnamic acid, mandelic acid, methanesulfonic acid, ethanesulfonic acid, p-toluene-sulfonic acid, salicylic acid, and the like.

In some embodiments the salt is an acetonide salt.

Pharmaceutically acceptable base addition salts can be prepared from inorganic and organic bases. Salts derived from inorganic bases include sodium, potassium, lithium, ammonium, calcium and magnesium salts. Salts derived from organic bases include, but are not limited to, salts of primary, secondary and tertiary amines.

In addition, pharmaceutically acceptable salts include organic salts such as choline, glucosamine, tris, meglumine, lysine, arginine, tributylamine, and benzathine salts.

In some embodiments the API is an amorphous form, a crystalline form, a polymorph, a hydrate, or a solvate.

Unless otherwise specified, the doses described in this application (e.g., 100 µg) refer to the weight of the pharmacologically active moiety, rather than the weight of a given API salt or API ester. Thus, for example, when the insert contains a pharmaceutically acceptable salt or ester of an API, e.g., razuprotafib sodium, the weight must be adjusted to provide an amount of the API salt that is equivalent to the amount of the API described herein. For example, reference herein to an insert containing 100 µg of razuprotafib sodium means the insert contains an amount of the salt equivalent to 100 µg of the razuprotafib molecule. In another example, a Drug Release Rate of 100 µg/day means that the insert releases 100 µg/day of the pharmacologically active moiety (e.g., vorolanib).

In some embodiments of the invention, the API is vorolanib or a pharmaceutically acceptable salt thereof.

Vorolanib has the chemical designation (S,Z)—N-(1-(Dimethylcarbamoyl)pyrrolidin-3-yl)-5-((5-fluoro-2-oxoindolin-3-ylidene)methyl)-2,4-dimethyl-1H-pyrrole-3-carboxamide. Synonyms include the term "X-82". The molecular formula is $C_{23}H_{26}FN_5O_3$. The solubility of vorolanib in water is less than 0.1 µg/mL. Vorolanib has the following structure:

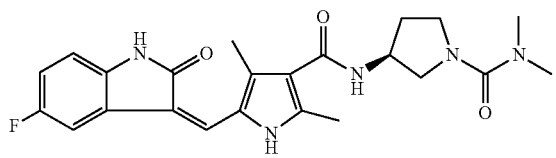 [SMILES: Cc1[nH]c(/C=C2\C(=O)Nc3ccc(F)cc32)c(C)c1C(=O)N[C@H]1CCN(C(=O)N(C)C)C1]

As used herein, "vorolanib or a pharmaceutically acceptable salt thereof" includes amorphous and crystalline forms, polymorphs, hydrates and solvates of vorolanib or its pharmaceutically acceptable salts.

Vorolanib is an orally active multikinase inhibitor and can inhibit activation of vascular endothelial growth factor receptors (VEGFR) and platelet-derived growth factor receptors (PDGFR).

Methods for manufacturing vorolanib are described, e.g., in U.S. Pat. Nos. 7,683,057; 8,524,709; 8,039,470; and US Publ. Appl. No. 2019/0233403; each of which is incorporated by reference in its entirety.

In some embodiments, the API is razuprotafib (AKB-9778), or a pharmaceutically acceptable salt or zwitterion thereof, e.g., razuprotafib sodium, razuprotafib choline, razuprotafib glucosamine, razuprotafib tris, razuprotafib meglumine, razuprotafib lysine, razuprotafib arginine, razuprotafib tributylamine, razuprotafib benzathine. Razuprotafib is a potent and selective inhibitor of the catalytic activity of VE-PTP (vascular endothelial protein tyrosine phosphatase). Razuprotafib promotes TIE2 activation, enhances ANG1-induced TIE2 activation, and stimulates phosphorylation of signaling molecules in the TIE2 pathway, including AKT, eNOS, and ERK.

Razuprotafib has the chemical designation [4-[(2S)-2-[[(2S)-2-(methoxycarbonylamino)-3-phenylpropanoyl]amino]-2-(2-thiophen-2-yl-1,3-thiazol-4-yl)ethyl]phenyl]sulfamic acid. The molecular formula is $C_{26}H_{26}N_4O_6S_3$. Its CAS registry number is 1008510-37-9. The chemical structure is:

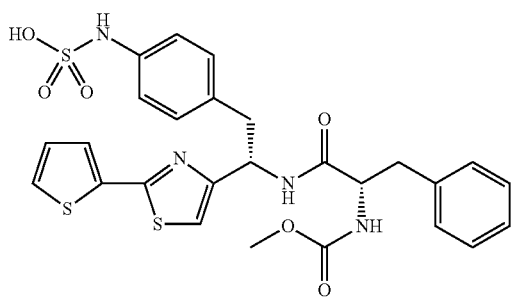 [SMILES: COC(=O)N[C@@H](Cc1ccccc1)C(=O)N[C@@H](Cc1ccc(NS(=O)(=O)O)cc1)c1csc(-c2cccs2)n1]

Methods for manufacturing razuprotafib are described, e.g., in U.S. Pat. No. 7,622,593, which is incorporated by reference in its entirety.

In some embodiments of the invention, the API is axitinib or a pharmaceutically acceptable salt or ester thereof.

Axitinib has the chemical designation N-methyl-2-[3-((E)-2-pyridin-2-yl-vinyl)-1H-indazol-6-ylsulfanyl]-benzamide. The molecular formula is $C_{22}H_{18}N_4OS$ and the molecular weight is 386.47 Daltons. The chemical structure is:

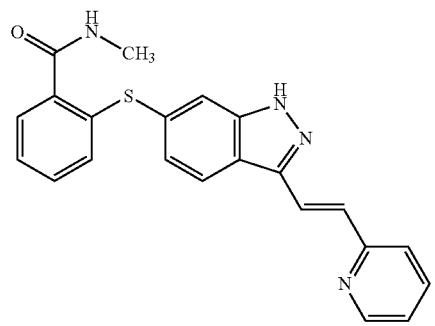 [SMILES: CNC(=O)c1ccccc1Sc1ccc2c(/C=C/c3ccccn3)n[nH]c2c1]

Axitinib has a pKa of 4.8. The solubility of axitinib in aqueous media over the range pH 1.1 to pH 7.8 is in excess of 0.2 μg/mL.

Methods for manufacturing Axitinib are described, e.g., in U.S. Pat. Nos. 6,891,044 and 8,791,140, each of which is incorporated by reference in its entirety.

Before formulation of the insert, the API may be milled to produce a fine particle size. In some embodiments, the $D_{90}$ for the API for use in manufacturing the insert is less than 200 μm, less than 100 μm, less than 50 μm, less than 40 μm, less than 30 μm, less than 20 μm, or less than 15 μm. In some embodiments, the D90 is about 0.01 μm to about 100 μm, about 0.01 μm to about 80 μm, about 0.1 μm to about 50 μm, about 0.1 μm to about 20, about 0.1 μm to about 15 μm, about 0.1 μm to about 12 μm, about 1 μm to about 50 μm, about 1p m to about 30 μm, about 1 μm to about 25 μm, about 1 μm to about 20 μm, about 1 μm to about 15 μm, about 1 μm to about 12 μm, about 5 μm to about 10, about 7 μm, about 8 μm, about 9 μm, about 10 μm, about 11 μm, or about 12 μm.

2. Ocular Drug Delivery Insert

An "ocular drug delivery insert" is a device that can be implanted in an eye, that contains a drug, and that can release the drug in the eye after implantation. "Ocular drug delivery insert" encompasses all of the inserts described herein.

The ocular drug delivery insert comprises a core comprising an API dispersed in a solid matrix. In some embodiments, the core is at least partially covered by a coating. The insert is bioerodible.

In other embodiments, the insert consists only of the core. It is not surrounded by a coating or any kind of barrier surrounding the core.

In some embodiments, the insert comprises both a core and a coating. The coating is a layer that partially or fully surrounds the core. The coating is an outer layer, which may be preformed into the desired shape (e.g., it may be a tube) before it is placed around the core, or the coating may be formed, e.g., by coextrusion of core and coating, spraying the coating onto the core, or dipping the core into the coating material once or multiple times (e.g., 1-10 coats). If the core is coated, the coating may completely surround the core, or may only partially surround the core.

The insert may be a variety of different shapes, e.g., a cylinder, rod, sphere, or disk. In some embodiments, the insert is cylindrical in shape, and the coating covers the entire surface of the cylinder except the ends of the rod or cylinder. The ends of the rod may act as delivery ports. In some embodiments, one end of the cylinder is covered by the coating and the other is not. In some embodiments, one of the ends is coved by a drug-impermeable cap such as a silicone cap. A rod is a solid geometrical figure with parallel sides, wherein the length of a side is longer than the diameter or longest side of the shape of the cross section. The cross-section shape may be a circle, oval, square, rectangle, triangle, or polygon such as a hexagon. One of skill in the art will recognize that due to manufacturing processes, the insert shape may not be precise, e.g., the exterior may not be smooth and perfectly even. For example, the sides of the cylinder or rod may not be perfectly straight or perfectly parallel. A cross section of a cylinder may not be a perfect circle or oval. Cross sections of other shapes may not precisely meet the definition of those shapes. For example, a square cross section may not have perfectly straight sides and the angles of the corners may not be exactly 90 degrees. Spheres or pellets may not be perfectly spherical.

a. Matrix

In some embodiments, the core is a solid matrix comprising a matrix polymer and an API, which may be present in a solid form, such as a powder, particles, or granules, dispersed throughout the matrix. The matrix ingredients and API form a homogenous mixture in which the API is dispersed. The matrix is solid at room temperature and is bioerodible. The matrix helps to control the rate of release of the API, thus modifying the rate of API release as compared to unformulated API. In some embodiments, the matrix slows the rate of drug release and provides for prolonged delivery of the drug, and less frequent dosing.

In some embodiments, the matrix also comprises other pharmaceutically acceptable ingredients. In other embodiments, the only material used to form the matrix is one or more matrix polymers.

The polymer used to form the matrix (the "matrix polymer") may comprise one or more of the following: polyvinyl alcohol (PVA), poly(caprolactone) (PCL), polyethylene glycol (PEG), poly(dl-lactide-co-glycolide) (PLGA), polyvinyl alcohol (PVA), poly(lactic acid) (PLA), poly(glycolic acid) (PGA), polyalkyl cyanoacrylate, or a copolymer thereof.

In certain embodiments, the matrix polymer comprises PVA. In some embodiments, the only inactive pharmaceutical ingredient in the matrix is PVA.

Various grades of PVA may be used. The degree of hydrolysis (DH) of the PVA may be about 70% to about 99$^+$%, and the molecular weight (MW) may be about 6000-200,000, i.e., the matrix polymer is about 70 mole % to about 99$^+$ mole % hydrolyzed PVA having a molecular weight of about 6,000-200,000. For example, the DH may be about 70% to about 80%, about 80% to about 90%, about 80% to about 85%, about 88% to about 90%, about 90% to about 99$^+$%, about 98 to about 99$^+$%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99$^+$%; and the MW may be about 5000, about 6000, about 7000, about 8000, about 9000, about 10,000, about 15,000, about 18,000, about 20,000, about 25,000, about 30,000, about 40,000, about 50,000, about 60,000, about 70,000, about 75,000, about 78,000, about 80,000, about 85,000, about 90,000, about 100,000, about 108,000, about 110,000, about 120,000, about 125,000, about 130,000, about 133,000, about 140,000, about 146,000, about 150,000, about 160,000, about 170,000, about 180,000, about 186,000, about 190,000 or about 200,000. In some embodiments, the MW may be about 5000-10,000, about 6000-10,000, about 9000-10,000, about 10,000-30,000, about 10,000-25,000, about 25,000-50,000, about 30,000-70,000, about 60,000-80,000, about 70,000-80,000, about 75,000-80,000, about 75,000-100,000, about 89,000-98,000, about 85,000-124,000, about 100,000-150,000, about 146,000-186,000, or about 150,000-200,000.

In certain embodiments the PVA is MW 6,000, 80% hydrolyzed, MW 9,000-10,000, 80% hydrolyzed, MW 25,000, 88% hydrolyzed, MW 25,000, 98% hydrolyzed, MW 30,000-70,000, 87-90% hydrolyzed, MW 78,000, 88% hydrolyzed, MW 78,000, 98% hydrolyzed, MW 78,000, 99+% hydrolyzed, MW 89,000-98,000, 99+% hydrolyzed, MW 85,000-124,000, 87-89% hydrolyzed, MW 108,000, 99$^+$% hydrolyzed, MW 125,000, 88% hydrolyzed, MW 133,000, 99% hydrolyzed, or MW 146,000-186,000, 99+% hydrolyzed.

In other embodiments, the matrix polymer comprises a mixture of two, three or four different grades of PVA. In some embodiments the PVA is a mixture of two different grades of PVA. In some embodiments, the ratio of the two grades in the mixture is from 1:1 to 1:15. In some embodiments, the ratio of the two grades is 1:6, 1:7, 1:8, 1:9, 1:10, 1:11 or 1:12 of the slower eroding PVA to the faster eroding PVA. The PVA erosion rate may be measured as described in Example 1. For example, in some embodiments the mixture of PVA has a ratio of 1:9 6000 MW, 80% DH to 125,000 MW, 88% DH. In other embodiments, the ratio of the two grades in the mixture is from 1:1 to 1:15, e.g., 1:6, 1:7, 1:8, 1:9, 1:10, 1:11 or 1:12, of the faster eroding PVA to the slower eroding PVA.

Examples of PVA mixtures include a mixture of MW 6,000, 80% hydrolyzed with MW 78,000, 98% hydrolyzed; a mixture of MW 6,000, 80% hydrolyzed with MW 78,000, 99$^+$% hydrolyzed; a mixture of MW 78,000, 98% hydrolyzed with MW 78,000, 99$^+$% hydrolyzed; and a mixture of MW 6,000, 80% hydrolyzed with MW 125,000, 88% hydrolyzed.

The MW and DH should be selected to provide the rate of drug release desired for the particular drug, the indication for which the ocular drug delivery insert will be used, the duration of drug release desired and the rate of erosion desired.

The polymer solution used to form the matrix may comprise about 1% w/w to about 20% w/w, about 1% w/w to about 15% w/w, about 2% w/w to about 15% w/w, about 2% w/w to about 12% w/w, about 2% w/w to about 10% w/w, about 3% w/w to about 10% w/w, about 3% w/w to about 8% w/w, about 3% w/w to about 6% w/w, about 5% w/w to about 20% w/w, about 5% w/w to about 15% w/w, about 10% w/w to about 20% w/w, about 5% w/w to about 8% w/w, about 5% w/w to about 7% w/w, about 6% w/w to about 8% w/w, about 6% w/w to about 7% w/w, about 2% w/w, about 2.5% w/w, about 3% w/w, about 3.5% w/w, about 4% w/w, about 4.5% w/w, about 5% w/w, about 5.5% w/w, about 6% w/w, about 6.5% w/w, about 7% w/w, about 7.5% w/w, about 8% w/w, about 8.5% w/w, about 9% w/w, about 9.5% w/w, about 10% w/w, about 10.5% w/w, about 11% w/w, about 11.5% w/w, about 12% w/w, about 13% w/w, about 14% w/w or about 15% w/w polymer, such as PVA, in a solvent, such as water or ethanol.

The polymer solution and the API may be combined in a ratio of, e.g., about 0.5:1, about 1:1, about 1:1.2, about 1:1.5, about 1:1.7, or about 1:2 w/w API:polymer solution.

In some embodiments the core comprises vorolanib or a pharmaceutically acceptable salt thereof and PVA. In some embodiments the core consists of vorolanib or a pharmaceutically acceptable salt thereof and PVA.

In some embodiments the core comprises axitinib or a pharmaceutically acceptable salt thereof and PVA. In some embodiments the core consists of axitinib or a pharmaceutically acceptable salt thereof and PVA.

In further embodiments, the PVA solution and API are combined in a ratio of about 1:1 w/w API:PVA solution.

In some embodiments, the PVA solution and API are combined in a ratio of about 1:2 w/w API:PVA solution.

In some embodiments, the core comprises about 0.1% w/w to about 90% w/w, about 0.1% w/w to about 80% w/w, about 0.1% w/w to about 70% w/w, about 0.1% w/w to about 60% w/w, about 0.1% w/w to about 50% w/w, about 0.1% w/w to about 40% w/w, about 0.1% w/w to about 30% w/w, about 0.1% w/w to about 25% w/w, about 0.1% w/w to about 20% w/w, about 0.1% w/w to about 15% w/w, about 0.1% w/w to about 10% w/w, about 1% w/w to about 20%, about 1% w/w to about 15%, about 1% w/w to about 10% w/w, about 1% w/w to about 9% w/w, about 1% w/w to about 8% w/w, about 1% w/w to about 7% w/w, about 1% w/w to about 6% w/w, about 2% w/w to about 10% w/w, about 2% w/w to about 8% w/w, about 2% w/w to about 6% w/w, about 3% w/w to about 90% w/w, about 3% w/w to about 75% w/w, about 3% w/w to about 60% w/w, about 3% w/w to about 40% w/w, about 3% w/w to about 20% w/w, about 3% w/w to about 15% w/w, about 3% w/w to about 10% w/w, about 3% w/w to about 8% w/w, about 3% w/w to about 7, about 3% w/w to about 5% w/w, about 4% w/w to about 60% w/w, about 4% w/w to about 50% w/w, about 4% w/w to about 40% w/w, about 4% w/w to about 25% w/w, about 4% w/w to about 20% w/w, about 4% w/w to about 15% w/w, about 4% w/w to about 10% w/w, about 4% w/w to about 8% w/w, about 4% w/w to about 7% w/w, about 5% w/w to about 10% w/w, about 5% w/w to about 8% w/w, or about 5% w/w to about 7% w/w inactive (non-API) ingredients, such as a matrix polymer. These weight percentages are based on the dry weight of the core (i.e., after any drying steps in processing).

In some embodiments, the amount of matrix polymer in the core is about 0.1% w/w to about 90% w/w, about 0.1% w/w to about 80% w/w, about 0.1% w/w to about 70% w/w, about 0.1% w/w to about 60% w/w, about 0.1% w/w to about 50% w/w, about 0.1% w/w to about 40% w/w, about 0.1% w/w to about 30% w/w, about 0.1% w/w to about 25% w/w, about 0.1% w/w to about 20% w/w, about 0.1% w/w to about 15% w/w, about 0.1% w/w to about 10% w/w, about 1% w/w to about 20%, about 1% w/w to about 15%, about 1% w/w to about 10% w/w, about 1% w/w to about 9% w/w, about 1% w/w to about 8% w/w, about 1% w/w to about 7% w/w, about 1% w/w to about 6% w/w, about 2% w/w to about 10% w/w, about 2% w/w to about 8% w/w, about 2% w/w to about 6% w/w, about 3% w/w to about 90% w/w, about 3% w/w to about 75% w/w, about 3% w/w to about 60% w/w, about 3% w/w to about 40% w/w, about 3% w/w to about 20% w/w, about 3% w/w to about 15% w/w, about 3% w/w to about 10% w/w, about 3% w/w to about 8% w/w, about 3% w/w to about 7, about 3% w/w to about 5% w/w, about 4% w/w to about 60% w/w, about 4% w/w to about 50% w/w, about 4% w/w to about 40% w/w, about 4% w/w to about 25% w/w, about 4% w/w to about 20% w/w, about 4% w/w to about 15% w/w, about 4% w/w to about 10% w/w, about 4% w/w to about 8% w/w, about 4% w/w to about 7% w/w, about 5% w/w to about 10% w/w, about 5% w/w to about 8% w/w, or about 5% w/w to about 7% w/w; or is about 1% w/w, 1.5% w/w, 2% w/w, 2.5% w/w, 3% w/w, 3.5% w/w, 4% w/w, 4.5% w/w, 5% w/w, 5.5% w/w, 6% w/w, 6.5% w/w, 7% w/w, 7.5% w/w, 8% w/w, 8.5% w/w, 9% w/w, 9.5% w/w, 10% w/w, 10.5% w/w, 11% w/w, 11.5% w/w, 12% w/w, 15% w/w, 18% w/w, 20% w/w, 25% w/w, 30% w/w, 35% w/w, 40% w/w, 50% w/w, 55% w/w, 60% w/w, 65% w/w, or 70% w/w. These weight percentages are based on the dry weight of the core (i.e., after any drying steps in processing).

The term "the insert consists of" a core comprising a solid matrix and API means that the entire insert is in the form of a solid matrix and API. The matrix may also include additional ingredients, but the insert does not have a shell, coating, cap, covering or tube or other outer layer, so that when immersed in a fluid environment, such as the vitreous humor of the eye or an in vitro drug release medium, the exterior of the core is in direct contact with this fluid.

b. Coating

In some embodiments of the invention, the insert comprises or consists of (a) a core comprising an API and a solid matrix, and (b) a coating. In other embodiments, the insert does not comprise a coating.

In some embodiments, the coating is permeable to the passage of the API, and acts as a diffusion membrane for the active pharmaceutical ingredient. A diffusion membrane may modify the API release rate of the matrix. The diffusion membrane may operate by, for example, modifying fluid flow into the matrix and/or limiting the passage of the API out of the matrix. In other embodiments, the coating increases the durability of the insert, as compared to an uncoated core, e.g., during processing, packaging, and/or delivering the dose. In certain embodiments, the coating both modifies the API release rate and increases the durability of the insert.

The coating may completely surround the core or may only partially surround the core. In some embodiments, the coating substantially covers the core, which means that it covers at least 70% of the surface area of the core. In some embodiments, the coating covers at least 75%, at least 80%, at least 85%, at least 90%, or at least 95% of the surface area of the core. In other embodiments, the coating surrounds about 40% to about 98%, about 50% to about 98%, about 60% to about 98%, about 70% to about 95%, about 70% to about 98%, about 70% to about 100%, about 80% to about 95%, about 80% to about 96%, about 80% to about 98%, about 80% to about 99%, about 90% to about 99%, or about 90% to about 98% of the surface area of the core. For a cylindrical insert, the surface area A is calculated as $A=2\pi rL+2\pi r2$, where r is the radius and L is the length of the insert. In some embodiments, an area of the core is left uncovered by a coating to form a delivery port. In some embodiments, more than one area is left uncovered to form more than one delivery port.

The delivery port is permeable to the API.

In some embodiments, the insert is rod-shaped, e.g., cylindrical, and only the two ends of the rod/cylinder are uncoated.

To provide an illustration of an embodiment of the ocular drug delivery insert of the invention, FIG. 1 shows a longitudinal cross-sectional view of an ocular drug delivery insert 100 according to one embodiment of the invention. Insert 100 comprises solid matrix core 105. Insert 100 further comprises a coating 110, substantially surrounding the core 105. Insert 100 also features two delivery ports 115 which are located at opposite ends of insert 100. In this particular embodiment, at least one of the delivery ports 115 comprises a membrane permeable to the API contained in core 105 to allow the API to be released from the delivery port/s 115.

In some embodiments, like the matrix, the coating is bioerodible.

The coating may comprise polymeric and/or nonpolymeric ingredients. In some embodiments, the coating comprises one or more polymers such as polyvinyl alcohol (PVA), poly(caprolactone) (PCL), polyethylene glycol (PEG), poly(dl-lactide-co-glycolide) (PLGA), poly(lactic acid) (PLA), poly(glycolic acid) (PGA), polyalkyl cyanoacrylate, or a copolymer thereof.

In embodiments in which the core is coated, the coating may be formed from 1-10 coats of polymer. For example, the core may be coated with 1 coat, 2 coats, 3 coats, 4 coats, 5 coats, 6 coats, 7 coats, 8 coats, 9 coats, or 10 coats. In some embodiments, each of the coats comprise the same polymer as the other coats. In certain embodiments, each of the coats consists of the same polymer as the other coats. In other embodiments in which the coating is formed from more than one coat, at least two of the coats comprise different polymers.

In certain embodiments, the coating comprises PVA. In other embodiments, the coating consists of PVA. In some embodiments, the only inactive pharmaceutical ingredient in the coating is PVA. In other embodiments, both the matrix polymer comprises PVA and the coating comprises PVA.

Various grades of PVA may be used. The degree of hydrolysis (DH) of the PVA may be about 70% to about $99^+$%, and the molecular weight (MW) may be about 6000-200,000, i.e., the matrix polymer is about 70 mole % to about $99^+$ mole % hydrolyzed PVA having a molecular weight of about 6,000-200,000. For example, the DH may be about 70% to about 80%, about 80% to about 90%, about 80% to about 85%, about 88% to about 90%, about 90% to about $99^+$%, about 98 to about $99^+$%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about $99^+$%; and the MW may be about 5000, about 6000, about 7000, about 8000, about 9000, about 10,000, about 15,000, about 18,000, about 20,000, about 25,000, about 30,000, about 40,000, about 50,000, about 60,000, about 70,000, about 75,000, about 78,000, about 80,000, about 85,000, about 90,000, about 100,000, about 108,000, about 110,000, about 120,000, about 125,000, about 130,000, about 133,000, about 140,000, about 146,000, about 150,000, about 160,000, about 170,000, about 180,000, about 186,000, about 190,000 or about 200,000. In some embodiments, the MW may be about 5000-10,000, about 6000-10,000, about 9000-10,000, about 10,000-30,000, about 10,000-25,000, about 25,000-50,000, about 30,000-70,000, about 60,000-80,000, about 70,000-80,000, about 75,000-80,000, about 75,000-100,000, about 89,000-98,000, about 85,000-124,000, about 100,000-150,000, about 146,000-186,000, or about 150,000-200,000. In certain embodiments the PVA is MW 6,000, 80% hydrolyzed, MW 9,000-10,000, 80% hydrolyzed, MW 25,000, 88% hydrolyzed, MW 25,000, 98% hydrolyzed, MW 30,000-70,000, 87-90% hydrolyzed, MW 78,000, 88% hydrolyzed, MW 78,000, 98% hydrolyzed, MW 78,000, 99+% hydrolyzed, MW 89,000-98,000, 99+% hydrolyzed, MW 85,000-124,000, 87-89% hydrolyzed, MW 108,000, $99^+$% hydrolyzed, MW 125,000, 88% hydrolyzed, MW 133,000, 99% hydrolyzed, or MW 146,000-186,000, 99+% hydrolyzed.

In other embodiments, the PVA is a mixture of two, three or four different grades of PVA. In some embodiments the PVA is a mixture of two different grades of PVA. In some embodiments, the ratio of the two grades in the mixture is from 1:1 to 1:15. In some embodiments, the ratio of the two grades is 1:6, 1:7, 1:8, 1:9, 1:10, 1:11 or 1:12 of the slower eroding PVA to the faster eroding PVA. The PVA erosion rate may be measured as described in Example 1. For example, in some embodiments the mixture of PVA has a ratio of 1:9 6000 MW, 80% DH to 125,000 MW, 88% DH. In other embodiments, the ratio of the two grades in the mixture is from 1:1 to 1:15, e.g., 1:6, 1:7, 1:8, 1:9, 1:10, 1:11 or 1:12, of the faster eroding PVA to the slower eroding PVA.

Examples of PVA mixtures include a mixture of MW 6,000, 80% hydrolyzed with MW 78,000, 98% hydrolyzed; a mixture of MW 6,000, 80% hydrolyzed with MW 78,000, 88% hydrolyzed; a mixture of MW 6,000, 80% hydrolyzed with MW 78,000, $99^+$% hydrolyzed; a mixture of MW 78,000, 88% hydrolyzed with MW 78,000, 98% hydrolyzed; a mixture of MW 78,000, 98% hydrolyzed with MW 78,000, $99^+$% hydrolyzed; and a mixture of MW 6,000, 80% hydrolyzed with MW 125,000, 88% hydrolyzed.

In certain embodiments, the core comprises a mixture of two different grades of PVA. In some embodiments, the coating comprises a mixture of two different grades of PVA. In yet other embodiments, both the core and coating comprise a mixture of two different grades of PVA. Where the coating comprises more than one coat of PVA, one or more of the coats may comprise a mixture of two different grades of PVA.

In embodiments in which both the core and coating comprise PVA, the core PVA and the coating PVA may be the same or different grades of PVA. Used herein, the term "different grade of PVA" means the PVA differs in molecular weight (MW), degree of hydrolysis (DH) or both MW and DH. In addition, as used herein, a mixture of grades of PVA is a "different grade of PVA" if the PVA to which the mixture is compared, is not a mixture of the same exact PVA grades, e.g., a mixture of 6,000, 80% hydrolyzed PVA with MW 78,000, 98% hydrolyzed PVA, would be considered a different grade of PVA from a PVA composition that contains only MW 78,000, 98% hydrolyzed PVA, or that contains a mixture of MW 6,000, 80% hydrolyzed PVA with MW 125,000, 88% hydrolyzed PVA.

Thus, the core PVA and the coating PVA may have the same MW and DH, or may differ in MW or DH, or may differ in both MW and DH. In some embodiments, the core comprises PVA, and the insert comprises a coating comprising PVA, wherein the MW of the coating PVA is the same as the MW of the core PVA, and the DH of the coating PVA is lower than the DH of the core PVA. In some embodiments, the MW and the DH of the coating PVA are each lower than the MW and DH of the core PVA.

In some embodiments, the coating is formed from more than one coat. When the insert coating comprises more than one coat of PVA, PVA having the same MW and DH may be used for the core and at least one of the coat/s. In other embodiments, the core comprises a PVA that differs in MW and/or DH from the PVA in at least one coat. In some embodiments, the core comprises a PVA that differs in both MW and DH from the PVA in at least one coat. In other embodiments, the PVA in the core and the PVA in at least one coat have the same MW but differ in DH. In some embodiments the DH of the PVA in at least one coat is lower than the DH of the PVA in the core. In other embodiments, the PVA in the core and the PVA in at least one coat differ in MW but have the same DH. In some embodiments the MW of the PVA in at least one coat is lower than the MW of the PVA in the core.

In some embodiments, the insert coating comprises a single coat comprising PVA. In other embodiments, the insert coating comprises more than one coat comprising PVA, and the PVA in each coating has the same MW and DH. In some embodiments, at least one coat comprises PVA that differs in MW and/or DH from the PVA in at least one other coat. In some embodiments, at least one coat comprises PVA that differs in both MW and DH from the PVA in at least one other coat. In some embodiments, no two coats comprise the same grade PVA, i.e., the PVA in each coat differs in MW and/or DH from each of the other coats.

In some embodiments in which the insert coating comprises more than one coat comprising PVA, the PVA in the outermost coat is more soluble (in PBS) than the PVA in any of the other coats. In some embodiments, the PVA in at least one of the coats is more soluble than the core PVA.

In certain embodiments, the insert comprises (a) a solid matrix core comprising PVA and an API, and (b) a coating comprising PVA substantially surrounding the core; and the DH of the PVA in the coating is lower than the DH of the PVA in the core. In one embodiment of this insert, the insert comprises 2 coats comprising PVA. In other embodiments, the insert comprises 3 coats comprising PVA. In yet other embodiments, the insert comprises 4 coats comprising PVA. In further embodiments, the insert comprises 5 coats comprising PVA. In yet other embodiments, the insert comprises 6 coats comprising PVA.

In embodiments with more than one coat, the first coat applied to the core is the innermost coat, and the last coat applied is the outermost coat. In some embodiments of these inserts having more than one coat of PVA, the DH of the PVA in the innermost coat is higher than the DH of the PVA in the outermost coat. In other embodiments of these inserts having more than one coat of PVA, the MW of the PVA in the innermost coat is higher than the MW of the PVA in the outermost coat. In some embodiments, the DH of the PVA in the outermost coat is lower than the DH of the PVA in each of the other coats. In other embodiments, the MW and DH of the PVA in the outermost coat is lower than the MW and DH of the PVA in any of the other coats.

In some aspects, the insert comprises (a) a solid matrix core comprising a PVA selected from the group consisting of MW 6,000, 80% hydrolyzed, MW 9,000-10,000, 80% hydrolyzed, MW 25,000, 88% hydrolyzed, MW 25,000, 98% hydrolyzed, MW 30,000-70,000, 87-90% hydrolyzed, MW 78,000, 88% hydrolyzed, MW 78,000, 98% hydrolyzed, MW 78,000, 99+% hydrolyzed, MW 89,000-98,000, 99+% hydrolyzed, MW 85,000-124,000, 87-89% hydrolyzed, MW 108,000, 99+% hydrolyzed, MW 125,000, 88% hydrolyzed, MW 133,000, 99% hydrolyzed, MW 146,000-186,000, 99+% hydrolyzed, and mixtures thereof; and an API, and (b) at least one coating comprising PVA substantially surrounding the core, wherein the PVA in the coating is selected from a PVA selected from the group consisting of MW 6,000, 80% hydrolyzed, MW 9,000-10,000, 80% hydrolyzed, MW 25,000, 88% hydrolyzed, MW 25,000, 98% hydrolyzed, MW 30,000-70,000, 87-90% hydrolyzed, MW 78,000, 88% hydrolyzed, MW 78,000, 98% hydrolyzed, MW 78,000, 99+% hydrolyzed, MW 89,000-98,000, 99+% hydrolyzed, MW 85,000-124,000, 87-89% hydrolyzed, MW 108,000, 99+% hydrolyzed, MW 125,000, 88% hydrolyzed, MW 133,000, 99% hydrolyzed, MW 146,000-186,000, 99+% hydrolyzed, and mixtures thereof, and wherein the PVA in the core and the PVA in at least one coating are different grades of PVA. In other aspects if this inert, the insert comprises at least 2 coats of PVA and the DH of the PVA in the outermost coat is lower than the DH of any of the PVA in each of the other coats.

The invention provides the ability to tailor the PVA grades used to manufacture the ocular insert. The PVA MW and DH of core and coating should be selected to provide the rate of drug release desired for the particular drug, the indication for which the ocular insert will be used, the duration of drug release desired, and the rate of erosion desired. Different durations of drug release may be desired for different ocular diseases or conditions. For example, a 12 month duration (such as is provided by Formulation A) of drug release may be desirable for the treatment of diabetic retinopathy, whereas a duration of less than a month may be desirable for an insert for inhibiting ocular inflammation caused by injury or surgery.

The polymer solution used to form the coating may comprise about 1% w/w to about 20% w/w, about 1% w/w to about 15% w/w, about 1% w/w to about 10% w/w, about 2% w/w to about 15% w/w, about 2% w/w to about 12% w/w, about 2% w/w to about 10% w/w, about 2% w/w to about 8% w/w, about 2% w/w to about 6% w/w, about 3% w/w to about 10% w/w, about 3% w/w to about 8% w/w, about 3% w/w to about 6% w/w, about 2% w/w, about 2.5% w/w, about 3% w/w, about 3.5% w/w, about 4% w/w, about 4.5% w/w, about 5% w/w, about 5.5% w/w, about 6% w/w, about 6.5% w/w, about 7% w/w, about 7.5% w/w, about 8% w/w, about 8.5% w/w, about 9% w/w, about 9.5% w/w, about 10% w/w about 10.5% w/w, about 11% w/w, about 11.5% w/w, about 12% w/w, about 13% w/w, about 14% w/w or about 15% w/w polymer, such as PVA, in a solvent, such as water or ethanol.

For inserts comprising a PVA coating, the core may be covered with 1-10 coats of a solution of PVA, i.e., the insert may comprise 1-10 PVA coatings. For example, the insert may comprise 1 coat, 2 coats, 3 coats, 4 coats, 5 coats, 6 coats, 7 coats, 8 coats, 9 coats, or 10 coats of PVA.

In some embodiments, the weight of the insert coating is about 0.1% w/w to about 60% w/w, about 0.1% w/w to about 40% w/w, about 0.1% w/w to about 20% w/w, about 1% w/w to about 40% w/w, about 1% w/w to about 30% w/w, about 1% w/w to about 20% w/w, about 1% w/w to about 10% w/w, about 1% w/w to about 6% w/w, about 3% w/w to about 20% w/w, about 3% w/w to about 10% w/w, about 3% w/w to about 6% w/w, about 5% w/w to about 30% w/w, about 5% w/w to about 25% w/w, about 5% w/w to about 20% w/w, about 5% w/w to about 15% w/w, about 5% w/w to about 10% w/w, about 10% w/w to about 25% w/w, about 10% w/w to about 20% w/w, about 10% w/w to about 18% w/w, or about 12% w/w to about 18% w/w of the insert. These weight percentages are based on the dry weight of the insert (i.e., after any drying steps in processing).

In some embodiments, the total amount of inactive ingredients in the insert is about 0.1% w/w to about 90% w/w, about 0.1% w/w to about 80% w/w, about 0.1% w/w to about 70% w/w, about 0.1% w/w to about 60% w/w, about 0.1% w/w to about 50% w/w, about 0.1% w/w to about 40% w/w, about 0.1% w/w to about 30% w/w, about 0.1% w/w to about 25% w/w, about 0.1% w/w to about 20% w/w, about 0.1% w/w to about 15% w/w, about 0.1% w/w to about 10% w/w, about 1% w/w to about 70% w/w, about 1% w/w to about 50% w/w, about 1% w/w to about 20%, about 1% w/w to about 15%, about 1% w/w to about 10% w/w, about 1% w/w to about 9% w/w, about 1% w/w to about 8% w/w, about 1% w/w to about 7% w/w, about 1% w/w to about 6% w/w, about 2% w/w to about 10% w/w, about 2% w/w to about 8% w/w, about 2% w/w to about 6% w/w, about 3% w/w to about 90% w/w, about 3% w/w to about 75% w/w, about 3% w/w to about 60% w/w, about 3% w/w to about 40% w/w, about 3% w/w to about 20% w/w, about 3% w/w to about 15% w/w, about 3% w/w to about 10% w/w, about 3% w/w to about 8% w/w, about 3% w/w to about 7, about 3% w/w to about 5% w/w, about 4% w/w to about 60% w/w, about 4% w/w to about 50% w/w, about 4% w/w to about 40% w/w, about 4% w/w to about 25% w/w, about 4% w/w to about 20% w/w, about 4% w/w to about 15% w/w, about 4% w/w to about 10% w/w, about 4% w/w to about 8% w/w, about 4% w/w to about 7% w/w, about 5% w/w to about 40% w/w, about 5% w/w to about 30% w/w, about 5% w/w to about 25% w/w, about 5% w/w to about 20% w/w, about 5% w/w to about 15% w/w, about 5% w/w to about 7% w/w, about 10% w/w to about 25% w/w, about 10% w/w to about 22% w/w, about 15% w/w to about 25% w/w, about 15% w/w to about 22% w/w, or about 18% w/w to about 22% w/w. These weight percentages are based on the dry weight of the insert (i.e., after any drying steps in processing).

In some embodiments, the amount of PVA in the insert is about 0.1% w/w to about 30% w/w, about 0.1% w/w to about 25% w/w, about 0.1% w/w to about 20% w/w, about 0.1% w/w to about 15% w/w, about 0.1% w/w to about 10% w/w, about 1% w/w to about 80% w/w, about 1% w/w to about 75% w/w, about 1% w/w to about 60% w/w, about 1% w/w to about 30% w/w, about 1% w/w to about 20%, about 1% w/w to about 15%, about 1% w/w to about 10% w/w, about 1% w/w to about 9% w/w, about 1% w/w to about 8% w/w, about 1% w/w to about 7% w/w, about 1% w/w to about 6% w/w, about 2% w/w to about 10% w/w, about 2% w/w to about 8% w/w, about 2% w/w to about 6% w/w, about 3% w/w to about 90% w/w, about 3% w/w to about 80% w/w, about 3% w/w to about 75% w/w, about 3% w/w to about 70% w/w, about 3% w/w to about 60% w/w, about 3% w/w to about 40% w/w, about 3% w/w to about 20% w/w, about 3% w/w to about 15% w/w, about 3% w/w to about 10% w/w, about 3% w/w to about 8% w/w, about 3% w/w to about 7, about 3% w/w to about 5% w/w, about 4% w/w to about 60% w/w, about 4% w/w to about 50% w/w, about 4% w/w to about 40% w/w, about 4% w/w to about 25% w/w, about 4% w/w to about 20% w/w, about 4% w/w to about 15% w/w, about 4% w/w to about 10% w/w, about 4% w/w to about 8% w/w, about 4% w/w to about 7% w/w, about 5% w/w to about 40% w/w, about 5% w/w to about 30% w/w, about 5% w/w to about 25% w/w, about 5% w/w to about 20% w/w, about 5% w/w to about 15% w/w, about 5% w/w to about 10% w/w, about 5% w/w to about 7% w/w, about 10% w/w to about 25% w/w, about 10% w/w to about 22% w/w, about 15% w/w to about 25% w/w, about 15% w/w to about 22% w/w, or about 18% w/w to about 22% w/w. These weight percentages are based on the dry weight of the insert (i.e., after any drying steps in processing).

In some embodiments, the invention provides an insert having a very high drug content, relative to the inactive ingredients in the insert, which is surprising given the ability of the insert to provide release of the drug over extended periods. In some embodiments, the amount of API in the insert is about 5% w/w to about 98%, about 10% w/w to about 98%, about 15% w/w to about 98%, about 20% w/w to about 98%, about 30% w/w to about 98%, about 40% w/w to about 98%, about 50% w/w to about 98%, about 60% w/w to about 98% w/w, about 65% w/w to about 98% w/w, about 70% w/w to about 98% w/w, about 75% w/w to about 98% w/w, about 65% w/w to about 90% w/w, about 70% w/w to about 90% w/w, about 75% w/w to about 90% w/w, about 80% w/w to about 90% w/w, about 80% w/w to about 99% w/w, about 85% w/w to about 98% w/w, about 90% w/w to about 99% w/w or about 90% w/w to about 98% w/w. These weight percentages are based on the dry weight of the insert (i.e., after any drying steps in processing).

In some embodiments, the only inactive ingredient in the insert is a polymer such as PVA.

The thickness of the coat around the core may be e.g., about 20 μm to about 400 μm, about 20 μm to about 300 μm, about 20 μm to about 200 μm, about 20 μm to about 100 μm, about 5 μm to about 75 μm, about 5 μm to about 50 μm, or about 5 μm to about 25 μm.

c. Insert Shape and Dimensions

In some embodiments, when the insert is prepared for implantation within the vitreous of the eye, the insert does not exceed about 15 mm, or preferably does not exceed about 10 mm, in any direction, so that the insert can be inserted through an incision of 15 mm or smaller.

In some embodiments, the insert may be shaped and sized for injection. In some embodiments, the insert is sized and shaped to fit through a cannula or needle of 20 gauge or smaller. This means that the insert can be injected through either a cannula or a needle having the recited gauge without an unusual amount of force. The phrase "or smaller" in this context means having a smaller outer diameter. A smaller outer diameter will correspond to a larger gauge size number, e.g., a 25 gauge needle has a smaller outer diameter than a 22 gauge needle.

In some embodiments, the insert is sized and shaped to fit through a 20 to 27 gauge needle or cannula, a 21 to 27 gauge needle or cannula, a 22 to 27 gauge needle or cannula, a 23 to 27 gauge needle or cannula, a 24 to 27 gauge needle or cannula, a 25 to 27 gauge needle or cannula, or a 25.5 to 27 gauge needle or cannula.

In other embodiments, the insert is sized and shaped to fit through a cannula or needle of 20 gauge or smaller, 22 gauge or smaller, 23 gauge or smaller, 24 gauge or smaller, 25 gauge or smaller, 25.5 gauge or smaller, 26 gauge or smaller, or 26.5 gauge or smaller. Preferably, the insert is sized and shaped to fit through a cannula or needle smaller than 25 gauge, smaller than 26 gauge, or smaller than 27 gauge. In some embodiments, the insert is sized and shaped to fit through a cannula or needle of about 29 gauge to about 25.5 gauge, such as from about 28 gauge to about 25.5 gauge, or from about 28 gauge to about 26 gauge. In some embodiments, the needle or canula is about 22, 22s, 23, 24 or 25 gauge, but preferably is about 25.5, 26, 26.5, 26s, 27, 27.5, 28, 28.5, 29, 29.5, 30 or 30.5 gauge.

In some embodiments the insert is rod-shaped, cylindrical or spherical, and may be less than about 12 mm long and less than about 1 mm in diameter.

In some embodiments, the insert may be rod shaped or cylindrical and does not exceed 8 mm in length and 3 mm in diameter.

In some embodiments, the insert has a length of about 1 mm to 10 mm, 2 mm to 10 mm, 1 mm to 4 mm, 4 mm to 8 mm, 6 mm to 10 mm, 8 mm to 10 mm, 1 mm to 12 mm, 2 mm to 12 mm, or 4 mm to 12 mm; about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 10.5 mm, about 11 mm, about 11.5 mm, about 12 mm, about 12.5 mm, about 13 mm, about 13.5 mm, about 14 mm, about 14.5 mm, or about 15 mm.

In some embodiments, the insert has a diameter of about 0.1 mm to about 2 mm, about 0.1 mm to about 1 mm, about 0.1 mm to about 0.8 mm, about 0.1 mm to about 0.6 mm, about 0.1 mm to about 0.5 mm, about 0.3 mm to about 0.5 mm, about 0.3 mm to about 0.4 mm, about 0.2 mm to 0.4 mm, about 0.1 mm to 0.2 mm, or about 0.4 mm to about 0.6 mm; about 0.57 mm, about 0.50 mm, about 0.41 mm, about 0.42 mm, about 0.37 mm, about 0.34 mm, about 0.31 mm, about 0.26 mm, or about 0.15 mm.

d. Insert Manufacture

The insert may be manufactured by mixing the API with a matrix polymer. In some embodiments, the matrix polymer is a solution of the polymer in a solvent, e.g., in water or ethanol. The API, matrix polymer solution, and any other matrix ingredients are mixed to form a paste suitable for extrusion through a dispensing tip. The paste may be extruded through an 18-25 gauge canula or dispensing tip. In some embodiments a 21-23 or a 23-26 gauge canula or dispensing tip is used. For example, the gauge of the cannula or dispensing tip may be 20, 21, 22 23, 24, 25 or 26. The extruded paste is referred to herein as an extrudate, an elongated shaped matrix, or a rod. The rods may be about 4-5 inches (about 10-13 cm) in length. The extrudate is solid at room temperature. The extrudate may be coated with one or more additional layers. In some embodiments, the extrudate is dried at room temperature for at least 24 hours before coating.

In an extrusion process, extrusion parameters may be controlled, such as fluid pressure, flow rate, and temperature of the material being extruded. Suitable extruders may be selected for the ability to deliver the co-extruded materials at pressures and flow rates sufficient to form the product at sizes of the die head and exit port or dispensing tip that will produce a product which, when segmented, can be injected through a needle or cannula as described herein.

If a polymer solution was used, and the extrudates are to be coated, the extruded API-polymer mixture is allowed to dry before coating. For example, the extrudate may be allowed to dry for about 30 minutes to about 48 hours at room temperature before coating.

The extrudate may be coated with one or more layers, although in some embodiments no coating is applied. The coating may be applied before segmenting into the desired insert length. The coating may be applied by dipping the extrudate into a liquid coating material and allowing it to dry or harden. This process may be repeated to add additional coating layers. Alternatively, the coating may be sprayed onto the extrudate.

In other embodiments, the coating/outer layer may be pre-formed in, e.g., a tube shape, and the API-polymer paste may be extruded into the tube.

Depending on the polymer used for the matrix, matrix may be cured. Curing may be done, for example, by heating in an oven, microwave heating or chemical treatment.

In some embodiments, the matrix is uncured or is cured by heating at a temperature less than 80° C. In other embodiments the matrix is cured for about 10 minutes to about 300 minutes (5 hours) at a temperature of about 80° C. to about 160° C., about 15 minutes to about 4 hours at a temperature of about 80° C. to about 160° C., about 15 minutes to about 4 hours at about 120° C. to about 160° C., about 10 minutes to about 4 hours at about 130° C. to about 150° C., about 10 minutes to about 30 minutes at about 140° C. to about 160° C., about 30 minutes to about 4 hours at about 130° C. to about 150° C., about 200 minutes to about 1440 minutes at about 60° C. to about 120° C., about 300 minutes to about 600 minutes at about 60° C. to about 100° C., about 400 minutes to about 500 minutes at about 80° C. to about 90° C., about 600 minutes to about 1440 minutes at about 80° C. to about 120° C., about 800 minutes to about 1440 minutes at about 80° C. to about 110° C.

In additional embodiments, the matrix is cured for about 200 minutes to about 1600 minutes at about 90° C., about 200 minutes to about 500 minutes at about 90° C., about 500 minutes to about 1600 minutes at about 90° C., about 240 minutes at about 90° C., about 480 minutes at about 90° C., or about 1440 minutes at about 90° C.

In some embodiments, the matrix is cured for about 200 minutes to about 1600 minutes at about 100° C., about 200 minutes to about 500 minutes at about 100° C., about 500 minutes to about 1600 minutes at about 100° C., about 240 minutes at about 100° C., about 480 minutes at about 100° C., or about 1440 minutes at about 100° C.

In some embodiments, the matrix is cured for about 30 minutes to about 1600 minutes at about 110° C., about 30 minutes to about 200 minutes at about 110° C., about 200 minutes to about 1600 minutes at about 110° C., about 30 minutes at about 110° C., about 60 minutes at about 110° C., about 240 minutes at about 110° C. or about 1440 minutes at about 110° C.

In yet other embodiments, the matrix is cured for about 10 minutes to about 4 hours at about 140° C., about 10 minutes to about 1 hour at about 140° C., about 15 minutes to about 30 minutes at about 140° C., about 30 minutes to about 1 hour at about 140° C., about 1 hour to about 4 hours at about 140° C., or about 1 hour to about 3 hours at about 140° C.

Thus, examples of curing time include about 10 minutes, about 15 minutes, about 20 minutes, about 30 minutes, about 45 minutes, about 60 minutes, about 75 minutes, about 90 minutes, about 105 minutes, about 120 minutes, about 150 minutes, about 180 minutes, about 210 minutes, about 240 minutes, about 270 minutes, about 300 minutes, about 330 minutes, about 360 minutes, about 390 minutes, about 420 minutes, about 450 minutes, about 480 minutes, about 510 minutes, about 540 minutes, about 570 minutes, about 600 minutes, about 630 minutes, about 660 minutes, about 690 minutes, about 720 minutes, or about 1440 minutes. The curing temperature may be, for example, room temperature, about 60° C., about 70° C., about 80° C., about 85° C., about 90° C., about 100° C., about 110° C., about 120° C., about 125° C., about 130° C., about 135° C., about 140° C., about 145° C., about 150° C., about 155° C. or about 160° C. After curing, the rods may be allowed to cool to room temperature before other manufacturing steps are performed. If the insert will be coated, the coating may be applied before or after curing.

Drug release rate was evaluated for both uncoated and PVA coated-PVA matrix inserts. The inventors found, generally, that the higher the curing temp and longer the curing period, the slower the drug release rate, but also the slower the erosion.

When all curing, cooling and/or coating and drying steps are complete, the rods are segmented into about 1 mm to about 15 mm long inserts, e.g., about 1 mm to about 10 mm, or about 2 mm to about 6 mm inserts. For example, the rods may be segmented into about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 10.5 mm, about 11 mm, about 11.5 mm, about 12 mm, about 12.5 mm, about 13 mm, about 13.5 mm, about 14 mm, about 14.5 mm, or about 15 mm inserts.

The rods may be segmented, or otherwise cut into a series of shorter products, by any suitable technique for cutting the rods, which may vary according to whether the product is cured, uncured, or partially cured. For example, the segmenting station may employ pincers, shears, slicing blades, or any other technique. The technique applied may vary according to a configuration desired for each cut portion of the product. For example, where open ends are desired, a shearing action may be appropriate. However, where it is desired to seal each end as the cut is made, a pincer may be used.

In some embodiments the extrudates are dip coated in a solution of PVA in water with a concentration of PVA of about 1% w/w to about 20% w/w, about 1% w/w to about 15% w/w, about 1% w/w to about 10% w/w, about 2% w/w to about 10% w/w, about 2% w/w to about 8% w/w, about 2% w/w to about 6% w/w, about 3% w/w to about 6% w/w, about 2% w/w, about 2.5% w/w, about 3% w/w, about 3.5% w/w, about 4% w/w, about 4.5% w/w, about 5% w/w, about 5.5% w/w, about 6% w/w, about 6.5% w/w, about 7% w/w, about 7.5% w/w, about 8% w/w, about 8.5% w/w, about 9% w/w, about 9.5% w/w, or about 10% w/w.

The coated extrudates may then be air dried. The process of dip-coating may be repeated 1-10 more times, preferably 1-6 or 1-5 more times, and air dried between each coating. The coated extrudates may then be cured, as described above. After cooling, the extrudates are then cut into inserts.

e. Insert Properties

Some diseases of the eye, including those described above, may require treatment for the remainder of the patient's life. Currently available therapies require repeated therapeutic treatments. However repetitive therapy by implantation of a drug delivery device into the eye is limited for devices that contain non-biodegradable materials, as the non-biodegradable remains of the devices accumulate in the eye. Thus, providing an implantable drug delivery device that fully erodes around the time, or shortly after, the next device needs to be implanted would be very beneficial to patients.

However, it is extremely challenging to design a drug delivery device that provides controlled release of therapeutics levels of a drug for a significant period of time that is also able to completely erode within, e.g., a matter of months or within about a year. Many materials that are effective at controlling drug release for significant periods are not bio-erodible or erode too slowly.

In addition, providing a drug delivery device small enough to implant into the eye of a patient with minimal discomfort, yet that can contain a sufficient drug load to provide sustained delivery of the drug significantly increases the challenges described above. The difficulty of handling and processing such devices without significant breakage also adds to the challenges.

The inventors have overcome these challenges to provide a drug delivery device small enough to be implanted into the eye with minimal discomfort that is able to provide sustained delivery of the drug for months while also fully eroding sometime after the drug delivery period of the device has ended. In addition, the inventors have found a way to provide devices having different drug delivery periods/durations and rates of delivery. Moreover, these devices provide an essentially linear release of the drug after an initial burst of drug delivery. In addition, the insert has a very high drug content, relative to the inactive ingredients in the insert, which is surprising given the ability of the insert to provide release of the drug over extended periods.

i. Insert Erosion:

In some embodiments, the insert is capable of completely eroding within 365 days. The ability of an insert to erode within a given period of time may be evaluated using the following Erosion Evaluation Protocol. A sample insert is placed in a 10 mL glass vial with 5 mL phosphate buffered saline (PBS), the vial is incubated at 37° C., the PBS in the vial is replaced once every 24 hours for each day of the time period of interest (e.g., 365 days, 200 days, 110 days). At the end of this period, the insert is removed from the vial, allowed to dry, and then visually inspected and weighed. The reduction in weight as compared to the original weight is calculated as follows:

$$\frac{\text{End Weight}}{\text{Start Weight}} \times 100 = \% \text{ remaining}$$

For example, if an insert that originally weighs 500 µg, and weighs 200 µg after incubating in PBS for 200 days according to the Erosion Evaluation Protocol, the insert weighs 40% of its original weight, and has lost 60% of its weight. It has undergone 60% erosion in 200 days. An insert is considered to be completely eroded when less than 10% of the original weight of the insert remains. In some embodiments, the insert completely erodes within 760 days, within 730 days, within 700 days, within 660 days, within 630 days, within 600 days, within 570 days, within 540 days, within 400 days, within 365 days, within 300 days, within 280 days, within 240 days, within 210 days, within 200 days, within 180 days, within 160 days, or within 140 days. In other embodiments, the insert is capable of at least 15% erosion within 95 days, at least 20% erosion within 95 days, at least 25% erosion within 95 days, at least 30% erosion within 95 days, at least 20% erosion within 110 days, at least 30% erosion within 110 days, at least 40% erosion within 110 days, at least 30% erosion within 180 days, at least 40% erosion within 180 days, at least 50% erosion within 180 days, at least 60% erosion within 180 days, at least 30% erosion within 220 days, at least 40% erosion within 220 days, at least 50% erosion within 220 days, at least 60% erosion within 220 days, at least 70% erosion within 220 days, at least 40% erosion within 280 days, at least 50% erosion within 280 days, at least 50% erosion within 280 days, at least 60% erosion within 280 days, at least 70% erosion within 280 days, at least 80% erosion within 280 days, at least 60% erosion within 365 days, at least 70% erosion within 365 days, at least 80% erosion within 365 days, at least 90% erosion within 365 days, at least 60% erosion within 400 days, at least 70% erosion within 400 days, at least 80% erosion within 400 days, at least 90% erosion within 400 days, at least 60% erosion within 440 days, at least 70% erosion within 440 days, at least 80% erosion within 440 days, or at least 90% erosion within 440 days measured using the Erosion Evaluation Protocol.

ii. Drug Release Rate:

The inventors found that curing temperature, curing duration and insert surface area all impact release rate. An increase in diameter with length kept constant, increased release rate. When the diameter was kept constant, increasing the length increased the release rate.

In some embodiments, the insert has a Drug Release Rate of about 0.01 µg/day to about 100 µg/day, about 0.01 µg/day to about 90 µg/day, about 0.01 µg/day to about 80 µg/day, about 0.01 µg/day to about 70 µg/day, about 0.01 µg/day to about 50 µg/day, about 0.01 µg/day to about 20 µg/day, about 0.01 µg/day to about 10 µg/day, about 0.1 µg/day to about 60 µg/day, about 0.1 µg/day to about 50 µg/day, about 0.1 µg/day to about 40 µg/day, about 0.1 µg/day to about 30 µg/day, about 0.1 µg/day to about 20 µg/day, about 0.1 µg/day to about 10 µg/day, about 0.1 µg/day to about 5 µg/day, about 0.1 µg/day to about 2 µg/day, about 0.1 µg/day to about 1 µg/day, about 0.5 µg/day to about 15 µg/day, about 0.5 µg/day to about 10 µg/day, about 1 µg/day to about 50 µg/day, about 1 µg/day to about 40 µg/day, about 1 µg/day to about 30 µg/day, about 1 µg/day to about 20 µg/day, about 1 µg/day to about 15 µg/day, about 1 µg/day to about 10 µg/day, or about 1 µg/day to about 5 µg/day. In some embodiments, this is the release rate after steady-state release is achieved. In some embodiments, this is the release rate after 2 days, 3 days, 5 days, 8 days, 10 days, 15 days, 20 days, 25 days, 30 days, 40 days, 50 days, 60 days, 70 days, 80 days, 90 days, 100 days, 105 days or 110 days of drug release.

In some embodiments, the insert has this release rate for at least 14 days, at least 30 days, at least 60 days, at least 90 days, at least 100 days, at least 120 days, at least 180 days, at least 200 days, at least 240 days, at least 270 days, at least 300 days, or at least 365 days, as measured by the in vitro Drug Release Method.

The following in vitro Drug Release Method is used to evaluate the amount of drug released: an insert is placed in a 10 mL glass tube, and 5 mL PBS is added to the tube. The tube is incubated in a water bath at 37° C. A sample of the medium is taken on each day of the stated period, and the release medium replaced with fresh PBS. The amount of API released may be measured quantitatively by HPLC as described in Example 2C.

The duration (total length of time) during which the insert releases API may be up to about 365 days, about 260 days, or about 200 days, or the duration may be at least about 8 weeks, at least about 10 weeks, at least about 12 weeks, at least about 18 weeks, at least about 22 weeks, at least about 28 weeks, at least about 30 weeks, at least about 36 weeks, at least about 40 weeks, at least about 44 weeks, or at least about 52 weeks. Alternatively, the duration of API release may be at least about 28 days, at least about 42 days, at least about 56 days, at least about 168 days, at least about 180 days, at least about 224 days, at least about 300 days, or at least about 365 days. The in vitro drug release test described above may be used to determine whether an insert releases drug for this duration.

In some embodiments, the insert of the invention provides an initial rapid release, or burst, of drug in vivo, for a period of time before achieving a steady state rate. In preferred embodiments of the invention, the initial period of rapid release is much less than total duration of API release (e.g., less than 10%). In some embodiments, this initial period is, e.g., 1 to 120 days, 20 to 120 days, 80 to 120 days, 1 to 20 days, 2 to 50 days, 3 to 40 days, 5 to 60 days, 1 day, 2 days, 3 days, 4 days, 5 days, 8 days, 10 days, 12 days, 15 days, 20 days, 25 days, 30 days, 40 days, 50 days, 60 days, 70 days, 80 days, 90 days, 100 days, 105 days, 110 days. In an in vitro study performed in rabbit eyes the inventors found a surprisingly high initial burst of drug release, meaning that the initial release of API from the insert was faster than expected, before leveling out to steady state. This burst may be beneficial as it allows $C_{max}$ and equilibrium to be achieved quickly, thus providing therapeutically effective amounts locally to the eye quickly. After this burst the API release rate levels out to provide a therapeutically effective amount of the API each day.

In preferred embodiments, the insert of the invention releases the API at a substantially constant rate (i.e., zero-order drug release kinetics, $R^2$ is from 0.7-1) over a predetermined duration after implantation. For example, it may release API at a substantially constant rate for about 14 days, about 28 days, about 42 days, about 56 days, about 168 days, about 180 days, about 224 days, about 300 days, or about 365 days. In some embodiments, the insert releases API at a substantially constant rate for at least 14 days, at least 28 days, at least 42 days, at least 56 days, at least 168 days, at least 180 days, at least 224 days, at least 270 days at least 300 days, at least 365 days, at least 540 days, or at least 600 days.

The duration of substantially constant API release from the insert may fall within a period of about 1 to about 48 months, about 2 to about 36 months, about 2 to about 24 months, about 2 to about 12 months, about 3 to about 9 months. In some aspects, the duration of substantially constant API release is about 60 days to about 730 days, about 60 days to about 540 days, about 60 days to about 365 days, about 60 days to about 300 days, about 60 days to about 270 days, about 90 days to about 365 days, about 90 days to about 270 days, or about 180 days to about 365 days. In some embodiments it is at least about 12 weeks, at least about 18 weeks, at least about 22 weeks, at least about 24 weeks, at least about 30 weeks, at least about 32 weeks, at least about 36 weeks, at least about 40 weeks, at least about 44 weeks, at least about 48 weeks, or at least about 52 weeks. The in vitro drug release test described above may be used to determine whether an insert releases drug for this duration.

3. Therapeutic Method a. Administering the Ocular Drug Delivery Insert

An "ocular drug delivery insert" is an implantable device. "Ocular drug delivery insert" encompasses all of the inserts described herein.

The ocular drug delivery insert may be administered to prevent or treat an ocular condition or disease of the eye in a subject in need thereof. In some embodiments, the ocular drug delivery insert is administered to treat an anterior ocular condition. In other embodiments, it may be administered to treat a posterior ocular condition. In some embodiments, the ocular drug delivery insert is administered to prevent an anterior ocular condition. In other embodiments, it may be administered to prevent a posterior ocular condition.

An "anterior ocular condition" is a disease, ailment, or condition that affects or involves an anterior (i.e., front of the eye, also referred to as the anterior segment) ocular region or structure, such as a periocular muscle or an eye lid, or a fluid located anterior to the posterior wall of the lens capsule or ciliary muscles. Thus, an anterior ocular condition can affect or involve the conjunctiva, the cornea, the anterior chamber, the iris, the posterior chamber (located between the iris and lens), the lens or the lens capsule and blood vessels and nerve which vascularize or innervate an anterior ocular region or site.

An anterior ocular condition can include a disease, ailment or condition such as, but not limited to, glaucoma.

A "posterior ocular condition" is a disease, ailment or condition that primarily affects or involves a posterior (i.e., back of the eye, also referred to as the posterior segment) ocular region or structure, such as choroid or sclera (in a position posterior to a plane through the posterior wall of the lens capsule), vitreous, vitreous chamber, retina, optic nerve or optic disc, and blood vessels and nerves that vascularize or innervate a posterior ocular region or site.

A posterior ocular condition can include a disease, ailment or condition such as, but not limited to, acute macular neuroretinopathy; Behcet's disease; geographic atrophy; choroidal neovascularization; diabetic uveitis; histoplasmosis; infections, such as fungal, bacterial, or viral-caused infections; macular degeneration, such as neovascular macular degeneration, acute macular degeneration, non-exudative age related macular degeneration and exudative age related macular degeneration; edema, such as macular edema, cystoids macular edema and diabetic macular edema; multifocal choroiditis; ocular trauma which affects a posterior ocular site or location; ocular tumors; retinal disorders, such as retinal vein occlusion, central retinal vein occlusion, diabetic retinopathy (including proliferative diabetic retinopathy), proliferative vitreoretinopathy (PVR), hypertensive retinopathy, retinal arterial occlusive disease such as central retinal artery occlusion (CRAO) and branch retinal artery occlusion (BRAO), retinal detachment, uveitic retinal disease; sympathetic ophthalmia; Vogt Koyanagi-Harada (VKH) syndrome; uveal diffusion; a posterior ocular condition caused by or influenced by an ocular laser treatment; or posterior ocular conditions caused by or influenced by a photodynamic therapy, photocoagulation, radiation retinotherapy, epiretinal membrane disorders, branch retinal vein occlusion, anterior ischemic optic neuropathy, non-retinopathy diabetic retinal dysfunction, and retinitis pigmentosa. Glaucoma may also be considered a posterior ocular condition because the therapeutic goal is to prevent the loss of or reduce the occurrence of loss of vision due to damage to or loss of retinal cells or optic nerve cells (e.g., via neuroprotection).

Thus, the invention provides methods of preventing or treating various ocular conditions by administering the ocular drug delivery insert to an eye of a subject in need thereof.

The API in the insert to be administered for a particular ocular condition or disease is selected based on the suitability of the API for that ocular condition. Thus, for example, an insert to be administered to reduce intraocular pressure will contain an API effective at lowering intraocular pressure.

In certain embodiments, the inserts are administered to prevent or treat macular degeneration in a subject in need thereof, e.g., age-related macular degeneration ("AMD"), such as dry AMD and wet AMD. The insert may be administered to prevent the death of retinal pigment epithelial cells. The insert may be administered to inhibit angiogenesis. In some embodiments, the inserts are administered to prevent or treat vision loss in a subject, such as vision loss associated with macular degeneration. In addition, the insert may be administered to prevent or delay the progression of dry AMD to wet AMD. In some embodiments, the insert is administered to prevent or treat retinal vein occlusion in a subject in need thereof, e.g., central retinal vein occlusion ("CRVO") or branch retinal vein occlusion ("BRVO"). In other embodiments, the inserts may be administered to prevent or treat non-ischemic retinal vein occlusion or ischemic retinal vein occlusion. In yet other embodiments, the insert is administered to treat diabetic retinopathy in an eye of a subject in need thereof. In some embodiments of these methods, the insert comprises a VEGF inhibitor, a kinase inhibitor such as a TKI inhibitor, a VE-PTP inhibitor, an Ang-1 inhibitor, an Ang-2 inhibitor, and/or a Tie-2 activator. In some embodiments the insert comprises vorolanib, or a pharmaceutically acceptable salt thereof. In other embodiments, the insert comprises axitinib, or a pharmaceutically acceptable salt thereof. In yet other embodiments, the insert comprises razuprotafib or a pharmaceutically acceptable salt or zwitterion thereof.

In some aspects, the insert is administered to inhibit VEGFR and/or PDGFR in an eye of a subject in need thereof. In some embodiments the insert administered to inhibit VEGFR and/or PDGFR comprises vorolanib, or a pharmaceutically acceptable salt thereof. In other embodiments, the insert comprises axitinib, In other embodiments, the insert is administered to activate Tie-2. In some embodiments of this method, the insert comprises a Tie-2 activator. In a further embodiment, the Tie-2 activator is razuprotafib or a pharmaceutically acceptable salt or zwitterion thereof.

The invention also provides a method of treating glaucoma in a subject in need thereof comprising administering a drug delivery insert. In some embodiments, the insert is administered to treat elevated intraocular pressure (IOP) in an eye of a subject in need thereof. In other embodiments, the insert is administered to reduce intraocular pressure in an eye of a subject in need thereof. In a further embodiment, the subject has elevated intraocular pressure. In another embodiment, the subject has ocular hypertension. In another embodiment, the subject has glaucoma. A reduction in IOP may be evaluated by determining the difference in the subject's IOP (in millimeters of mercury (mmHg)) at 60 days after implantation of the insert to relative to the subject's IOP at a pre-treatment baseline. In some embodiments of these methods, the insert comprises a Tie-2 activator. In a further embodiment, the Tie-2 activator is razuprotafib or a pharmaceutically acceptable salt or zwitterion thereof. In other embodiments of these methods, the insert comprises an alpha2-adrenergic receptor. In a further embodiment, the alpha2-adrenergic receptor is brimonidine, or a pharmaceutically acceptable salt thereof.

In yet other embodiments, the insert is administered to treat uveitis. In a further embodiment, the insert is administered to treat chronic non-infectious uveitis affecting the posterior segment of the eye. In some embodiments, the insert is administered to treat postoperative inflammation in the eye. In some embodiments of these methods, the insert comprises a steroidal anti-inflammatory agent.

In some embodiments, the invention provides a method of treatment comprising administering an ocular drug delivery insert of the invention comprising a VEGF inhibitor. In some embodiments of these methods, the VEGF inhibitor is vorolanib or a pharmaceutically acceptable salt thereof. The invention also encompasses combination treatments such as treatment of a subject with a VEGF inhibitor and a Tie-2 activator or treatment of a subject with a VEGF inhibitor and a steroidal anti-inflammatory agent.

Thus, in some embodiments of the method in which a VEGF inhibitor is administered, the method further comprises administering a Tie-2 activator, such as razuprotafib or a pharmaceutically acceptable salt or zwitterion thereof. In some embodiments of this method, the Tie-2 activator is administered in an ocular drug delivery insert of the invention.

In other embodiments of the method in which a VEGF inhibitor is administered, the method further comprises administering a steroidal anti-inflammatory agent, such as fluocinolone acetonide. In some embodiments of this method, the steroidal anti-inflammatory agent is administered in an ocular drug delivery insert of the invention.

In yet other embodiments, the invention provides methods of treatment comprising administering an ocular drug delivery insert of the invention comprising a Tie-2 activator. In other embodiments of this method, the method further comprises administering a VEGF inhibitor. In some embodiments of this method, the Tie-2 activator is razuprotafib or a pharmaceutically acceptable salt or zwitterion thereof. In additional embodiments of this method, the VEGF inhibitor is vorolanib or a pharmaceutically acceptable salt thereof. In further embodiments, the VEGF inhibitor is aflibercept, bevacizumab, or ranibizumab.

In the combination treatments of the invention, i.e., in methods in which more than one API is administered to the subject being treated, the different APIs administered may be administered in the same ocular drug delivery insert, in separate inserts, or one API may be delivered in an ocular drug delivery insert of the invention, and the other API/s may be administered in another pharmaceutical formulation, which may be a different type of dosage form. For example, the dosage form may be a different type of ocular implant, an eye drop, a solution for injection, or a suspension for injection. In addition, the different APIs administered may be administered at the same time in the same injection, or in separate injections during the same procedure, or at different times. When the different APIs are administered at different times, it is contemplated that the dosage form or insert used to deliver the first API is still releasing/delivering the first API when the dosage form or insert containing the other API is administered.

The various embodiments of the invention are generally provided to deliver a therapeutically effective concentration of an API locally, e.g., to an eye of a subject. In certain embodiments, the method for treating an ocular condition comprises disposing the insert on the surface of an eye or within an eye, such as to the vitreous or aqueous of an eye. In certain embodiments, the inserts of the invention may be delivered to any site in or on an eye, e.g., the anterior segment or posterior segment.

Administering the insert may comprise inserting the insert into an eye of a subject, such as inserting the insert into the aqueous humor or, preferably, into the vitreous humor of an eye. Administering the insert may comprise surgically implanting the insert into or onto an eye, such as a scleral implant, subconjunctival implant, suprachoroidal implant, suprascleral implant, or intravitreal implant. The insert can be surgically implanted into an eye of the subject, for example, into the vitreous of an eye, under the retina, or onto the sclera. In some embodiments, the insert may be placed by injection through a needle or cannula. The insert can gradually release an API in the eye, thus avoiding painful frequent administrations of the drug.

In certain embodiments, the insert is injected into an eye of the subject, preferably without requiring an incision. In certain aspects, the insert is injected into the vitreous of an eye. In preferred embodiments, administering the insert comprises intravitreal injection.

In some embodiments, a needle or cannula having a gauge size of 20-27 is used for the injection. In other embodiments, a needle or cannula having a gauge size of 25 to 27 is used. In preferred embodiments, a needle smaller than 25 gauge is used for the injection, e.g., a needle with a gauge of 25.5, 26, 26.5 or 27.

In some embodiments of the method of administration of the invention, before injection of the insert, a topical and/or subconjunctival anesthesia may be administered at the injection site. In addition, a broad-spectrum microbicide may be administered into the lower fornix. The insert may be place inferior to the optic disc and posterior to the equator of the eye. The conjunctiva may be displaced so that after withdrawing the needle, the conjunctival and scleral needle entry sites will not align. The needle used to inject the insert may be inserted through the conjunctiva and sclera up to the positive stop of the applicator, and the plunger depressed to deliver the insert into the back of the eye.

In some embodiments, an (one or more) insert is administered once every 90 days to 270 days, once every 90 days to 180 days, once every 120 to 720 days, once every 270 to 720 days, once every 270 to 540 days, once every 360 to 720 days, once every 360 to 540 days, or once every 540 to 720 days.

b. Subjects

The subject may be selected from rodents, lagomorphs, ovines, porcines, canines, felines, equines, bovines, and primates. In preferred embodiments, the subject is a human. In some embodiments of the methods of treatment provided herein, the subject is in need of treatment described because the subject has the condition being treated. In some embodiments of the methods of prevention provided herein, the subject is in need of prophylaxis of the condition described because the subject is at risk of the condition.

c. Dose

In some embodiments, the total dose of API delivered is about 0.0001 µg/day to about 200 µg/day, about 0.0001 µg/day to about 150 µg/day, about 0.0001 µg/day to about 100 µg/day, about 0.0001 µg/day to about 80 µg/day, about 0.0001 µg/day to about 50 µg/day, about 0.0001 µg/day to about 30 µg/day, about 0.0001 µg/day to about 10 µg/day, about 0.0001 µg/day to about 5 µg/day, about 0.0001 µg/day to about 1 µg/day, about 0.001 µg/day to about 200 µg/day, about 0.001 µg/day to about 150 µg/day, about 0.001 µg/day to about 100 µg/day, about 0.001 µg/day to about 80 µg/day, about 0.001 µg/day to about 60 µg/day, about 0.001 µg/day to about 40 µg/day, about 0.001 µg/day to about 30 µg/day, about 1 µg/day to about 25 µg/day, about 0.001 µg/day to about 20 µg/day, about 0.001 µg/day to about 15 µg/day, about 0.001 µg/day to about 10 µg/day, about 0.001 µg/day to about 8 µg/day, about 0.005 µg/day to about 15 µg/day, about 0.005 µg/day to about 10 µg/day, about 0.01 µg/day to about 100 µg/day, about 0.01 µg/day to about 90 µg/day, about 0.01 µg/day to about 80 µg/day, about 0.01 µg/day to about 70 µg/day, 0.01 µg/day to about 50 µg/day, 0.01 µg/day to about 20 µg/day, 0.01 µg/day to about 10 µg/day, about 0.1 µg/day to about 100 µg/day, about 0.1 µg/day to about 80 µg/day, about 0.1 µg/day to about 60 µg/day, about 0.1 µg/day to about 50 µg/day, about 0.1 µg/day to about 40 µg/day, about 0.1 µg/day to about 30 µg/day, about 0.1 µg/day to about 20 µg/day, about 0.1 µg/day to about 10 µg/day, about 0.1 µg/day to about 5 µg/day, about 0.1 µg/day to about 2 µg/day, about 0.1 µg/day to about 1 µg/day, about 0.5 µg/day to about 15 µg/day, about 0.5 µg/day to about 10 µg/day, about 1 µg/day to about 50 µg/day, about 1 µg/day to about 40 µg/day, about 1 µg/day to about 30 µg/day, about 1 µg/day to about 20 µg/day, about 1 µg/day to about 15 µg/day, about 1 µg/day to about 10 µg/day, or about 1 µg/day to about 5 µg/day. In some embodiments, this is the dose delivered after steady state is achieved. In some embodiments, this is the release rate after 2 days, 3 days, 5 days, 8 days, 10 days, 15 days, 20 days, 25 days, 30 days, 40 days, 50 days, 60 days, 70 days, 80 days, 90 days, 100 days, 105 days or 110 days of drug release.

In some embodiments, the API is vorolanib and the total dose of vorolanib delivered is about 0.1 µg/day to about 100 µg/day, about 0.1 µg/day to about 50 µg/day, about 0.5 µg/day to about 80 µg/day, about 0.5 µg/day to about 60 µg/day, about 0.5 µg/day to about 40 µg/day, about 1 µg/day to about 80 µg/day, about 1 µg/day to about 70 µg/day, about 1 µg/day to about 60 µg/day, about 1 µg/day to about 50 µg/day, about 1 µg/day to about 40 µg/day, about 1 µg/day to about 30 µg/day, about 1 µg/day to about 25 µg/day, about 1 µg/day to about 20 µg/day, about 1 µg/day to about 15 µg/day, about 1 µg/day to about 10 µg/day, about 1 µg/day to about 8 µg/day, about 5 µg/day to about 30 µg/day, about 5 µg/day to about 15 µg/day, about 5 µg/day to about 10

µg/day, or about 4 µg/day to about 15 µg/day. In some embodiments, this is the dose delivered after steady state is achieved.

In some embodiments, the API is axitinib and the total dose of axitinib delivered is about 0.0001 µg/day to about 100 µg/day, about 0.0001 µg/day to about 80 µg/day, about 0.0001 µg/day to about 50 µg/day, about 0.0001 µg/day to about 40 µg/day, about 0.0001 µg/day to about 30 µg/day, about 0.0001 µg/day to about 25 µg/day, about 0.0001 µg/day to about 20 µg/day, about 0.0001 µg/day to about 15 µg/day, about 0.001 µg/day to about 10 µg/day, about 0.001 µg/day to about 8 µg/day, about 0.001 µg/day to about 15 µg/day, or about 0.005 µg/day to about 10 µg/day. In some embodiments, this is the dose delivered after steady state is achieved.

This dose may be achieved by administering, e.g., 1-6 inserts at one time, i.e., for a single treatment in one eye. Thus, one treatment may require administering 1 insert, 2 inserts, 3 inserts, 4 inserts, 5 inserts, or 6 inserts at one time per eye of a subject. In some embodiments a subject may receive treatment of only one eye, or of both eyes. Where more than one insert is injected for a single treatment, the inserts may be injected individually in separate injections, or a few inserts may be injected in one injection. For example, 1, 2 or 3 inserts may be injected in a single injection. Where more than insert is to be injected for a single treatment, they may be divided into a few injections. For example, if 4-6 inserts are to be injected for a single treatment, they may be divided to be administered in 2 or 3 injections of 2-3 inserts/injection.

Each insert may comprise about 1 µg to about 3000 µg, about 1 µg to about 1000 µg, about 1 µg to about 500 µg, about 10 µg to about 2000 µg, about 10 µg to about 1000 µg, about 100 µg to about 500 µg, about 10 µg to about 800 µg, about 50 µg to about 600 µg, about 200 µg to about 2000 µg, about 600 µg to about 2000 µg, about 800 µg to about 2000 µg, about 800 µg to about 1500 µg, about 100 µg to about 500 µg, about 100 µg to about 300 µg, or about 300 µg to about 550 µg of API, e.g., vorolanib. For example, each insert may comprise about 400 µg, about 420 µg, about 440 µg, about 480 µg, about 500 µg, about 520 µg, about 540 µg, about 560 µg, about 580 µg, about 600 µg, about 620 µg, about 640 µg, about 660 µg, about 680 µg, about 700 µg, about 720 µg, about 740 µg, about 780 µg, about 800 µg, about 820 µg, about 840 µg, about 860 µg, about 880 µg, about 900 µg, about 920 µg, about 940 µg, about 960 µg, about 980 µg, about 1000 µg, about 1020 µg, about 1040 µg, about 1045 µg, about 1060 µg, about 1080 µg, or about 2000 µg of API, e.g., vorolanib.

The total amount of API, e.g., vorolanib, in all of the inserts together (total payload) may be about 50 µg to about 1000 µg, about 200 µg to about 6000 µg, about 600 µg to about 6000 µg, about 800 µg to about 6000 µg, about 600 µg to about 5040 µg, about 600 µg to about 4500 µg, about 1000 µg to about 5400 µg, about 1000 µg to about 3000 µg, or about 2000 µg to about 4000 µg. For example, the total API amount for all inserts may be about 1400 µg, about 1420 µg, about 1500 µg, about 1600 µg, about 1800 µg, about 1900 µg, about 1980 µg, about 2000 µg, about 2040 µg, about 2080 µg, about 3000 µg, about 3120 µg, about 3180 µg, about 3240 µg, about 3400 µg, about 3600 µg, about 3800 µg, about 4000 µg, about 4140 µg, about 4160 µg, about 4180 µg, about 4200 µg, about 4400 µg, about 4600 µg, about 5000 µg, or about 5040 µg.

4. Definitions

As used in the specification and claims, the following words and phrases are generally intended to have the meanings as set forth below, except to the extent that the context in which they are used indicates otherwise.

The singular forms "a," "an," and "the" include plural reference unless the context clearly dictates otherwise. For example, "a matrix polymer" means one or more matrix polymers.

The terms "bioerode", "bioerosion", "biodegrade", and "biodegradation" as used herein, refer to the gradual disintegration, dissolution, or breakdown of the insert over a period of time in a biological system, e.g., by one or more physical or chemical degradative processes, for example, enzymatic action, hydrolysis, ion exchange, or dissolution by solubilization, emulsion formation, or micelle formation.

The term "preventing", when used in relation to a condition refers to administration of a drug to reduces the frequency of, or delay the onset of, symptoms of a medical condition in a subject relative to a subject who does not receive the drug. Thus, prevention of macular degeneration includes, for example, reducing the number of diagnoses of macular degeneration in a treated population versus an untreated control population, and/or delaying the onset of symptoms of the macular degeneration in a treated population versus an untreated control population. Prevention of dry macular degeneration includes, for example, reducing the number of detectable drusen in a population of subjects receiving a prophylactic treatment relative to an untreated control population, and/or delaying the appearance of detectable drusen in a treated population versus an untreated control population, e.g., by a statistically and/or clinically significant amount. Prevention of vision loss includes, for example, reducing the magnitude of, or alternatively delaying, vision loss experienced by subjects in a treated population versus an untreated control population.

The term "treatment" means to diminish, ameliorate, or stabilize the existing unwanted condition.

The term "room temperature" means 22° C. "Solid at room temperature" means that solid at a temperature of 22° C.

When the term "about" is used in conjunction with a numerical value or range, it modifies that value or range by extending the boundaries above and below the numerical values set forth. In general, the term "about" is used herein to modify a numerical value above and below the stated value by a variance of 10 percent of the value, up or down (higher or lower), i.e., ±10%, unless a different variance is indicated (e.g., ±30%, ±20%, ±5%, ±1%, ±0.5% etc.).

The term "and/or" refers to and encompasses each of the listed items individually, as well as any and all possible combinations of one or more of the listed items.

The terms "comprising," "consisting of" and "consisting essentially of" have their usual accepted meanings in accordance with patent law. When the term "includes" or "including" is used in the specification or the claims, it is intended to be inclusive in a manner similar to the term "comprising" as that term is interpreted when employed as a transitional word in a claim.

The terms "optional" and "optionally" mean that the subsequently described circumstance may or may not occur, so that the description includes instances where the circumstance occurs and instances where it does not.

Where features or aspects of the disclosure or claims are described in terms of Markush groups, the group described includes any individual member as well as subgroups of members of the Markush group.

As will be understood by one skilled in the art all language such as "up to," "at least," "greater than," "less than," include the number recited and refer to ranges which can be subsequently broken down into sub-ranges. Finally, as will be understood by one skilled in the art, a range includes each individual member, and includes the endpoints of the range. For example, a group having 1-3 members refers to groups having 1, 2, or 3 members. Similarly, a group having 1-5 members refers to groups having 1, 2, 3, 4, or 5 members, and so forth.

The term "substantially all" as used herein refers to most of the total amount, e.g., at least 80%, at least 85%, at least 90%, at least 95%, or at least 99% of a total amount.

The term % w/w means the proportion of a particular substance within a mixture, as measured by weight or mass. Thus, for example, for an insert in which the core comprises at least about 8% w/w of inactive ingredients, the total weight of inactive ingredients in the core is at least about 8% of the total weight of the core. For example, if the total core weight is 100 mg, the inactive ingredients in this core would weigh at least 8 mg.

The term % w/v means the percent of weight of ingredient (such as a solute) in the total volume of solution. A 2% w/v PVA solution would mean 2 grams of PVA in 100 mL of solution. A 2% w/w PVA solution would mean 2 grams of PVA for 100 mg of solution.

All cited patents, published applications, scientific publications and books are incorporated herein by reference in their entireties.

While various aspects and embodiments have been disclosed herein, other aspects and embodiments will be apparent to those skilled in the art.

EXAMPLES

Example 1

The grades of PVA listed in the table below were made into films, which were then evaluated for rate of erosion and strength.

perature. The samples were then removed from the PBS, and 4 of each grade of PVA were oven dried at 50° C. for 2 hours, and 2 of each grade of PVA were air dried at room temperature on paper towels, as described in the table below. The samples were then weighed and imaged again.

TABLE 1

| PVA MW/DH | 100° C./3 h | 140° C./30 min | 140° C./4 h | Oven Dried 50° C./2 h | Air Dried at RT |
|---|---|---|---|---|---|
| 6000/80% | n = 6 | n = 6 | n = 6 | n = 4 | n = 2 |
| 25,000/88% | n = 6 | n = 6 | n = 6 | n = 4 | n = 2 |
| 78,000/98% | n = 6 | n = 6 | n = 6 | n = 4 | n = 2 |
| 125,000/88% | n = 6 | n = 6 | n = 6 | n = 4 | n = 2 |
| 1:9 Mixture of 6000/80% and 78,000/98% | n = 6 | n = 6 | n = 6 | n = 4 | n = 2 |
| 1:9 Mixture of 6000/80% and 125,000/88% | n = 6 | n = 6 | n = 6 | n = 4 | n = 2 |

Figure 2:
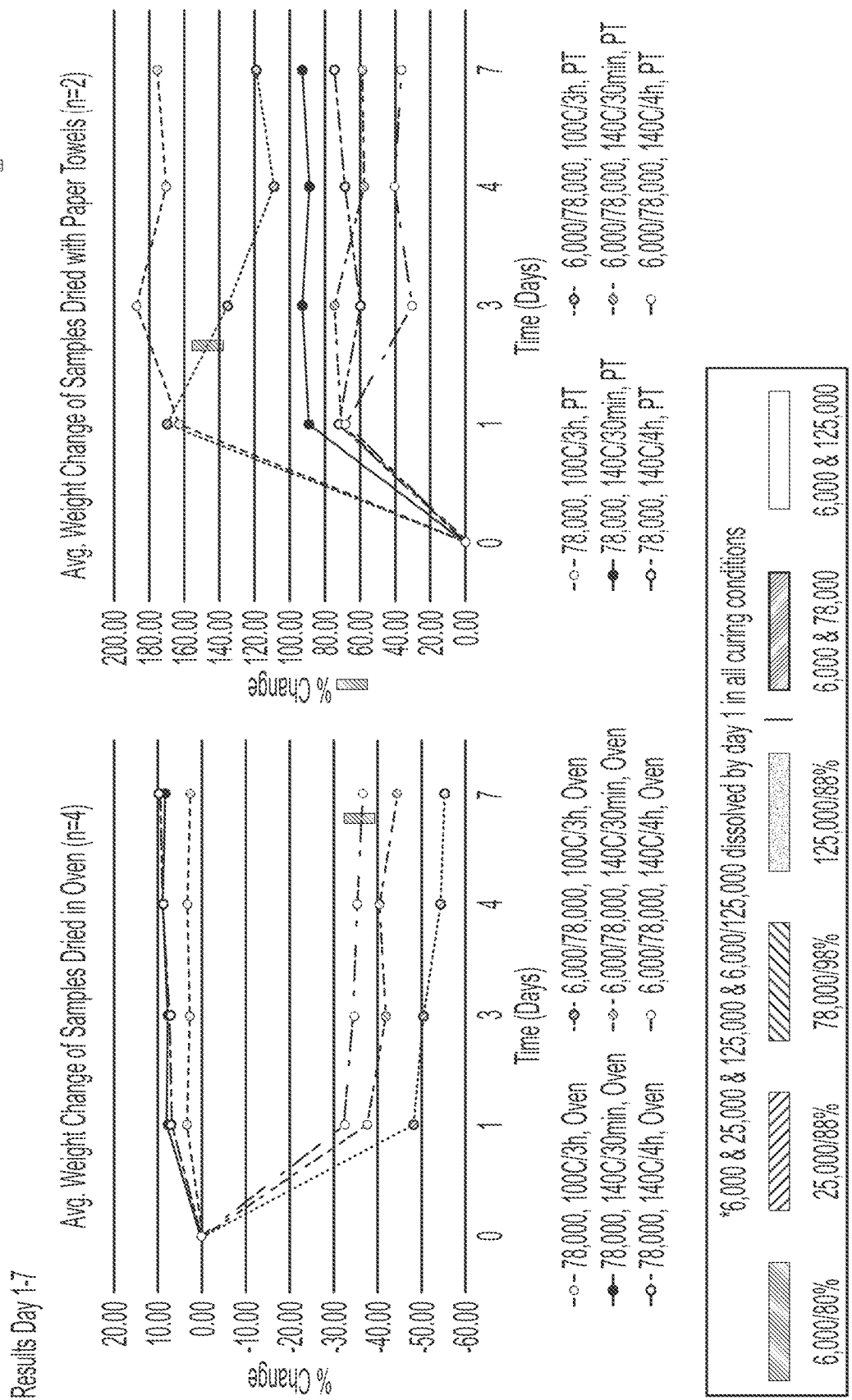
FIG. 2 depicts graphs showing the average weight change of films of different grades of PVA after 24 h immersion in PBS.
Figure 3:
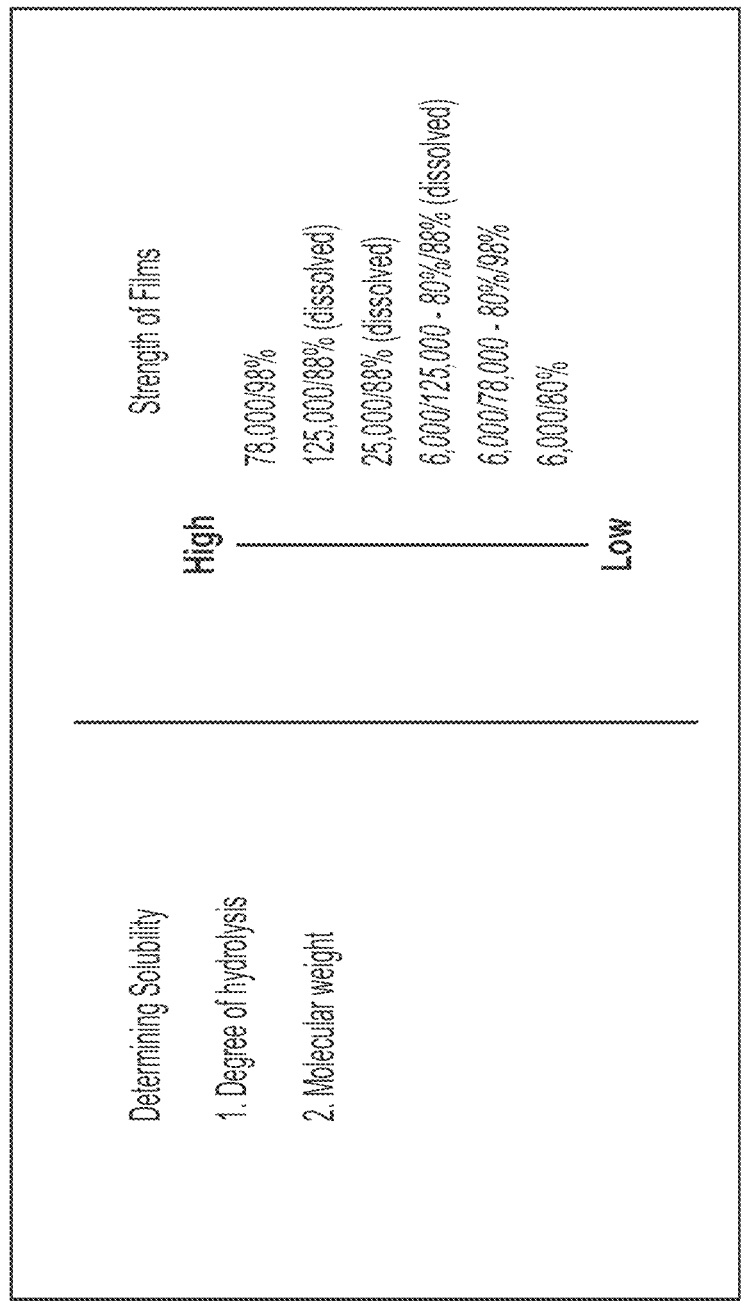
FIG. 3 depicts a scale showing the relative film strengths of the films evaluated.

The weight average weight change after 24-hour immersion in PBS was calculated and is shown in graphs in FIG. 2. The PVA degree of hydrolysis (DH) and molecular weight (MW) determine the solubility of the films. The 6000/80%, 25,000/88%, 125,000/88%, and 6000/80%-125,000/88% mix PVA films each dissolved by the end of day 1 in all curing conditions tested. The 78,000/98% film lasted the longest. The relative film strengths of the films tested are depicted in FIG. 3.

Example 2A

Inserts were made according to the parameters in the following table:

TABLE 2

| API:PVA Ratio | 1:1 | 1:1 | 1:1 | 1:1 | 1:1 | 1:1 | 1:1 | 1:1 | 1:1 | 1:1 | 1:1 |
|---|---|---|---|---|---|---|---|---|---|---|---|
| Core PVA Soln. | 4% | 4% | 4% | 4% | 4.5% | 4.5% | 4.5% | 4.5% | 4.5% | 4.5% | 5% |
| Coat PVA Soln. | 4% | 4% | 4% | 4% | 4.5% | 4.5% | 4.5% | 4.5% | 4.5% | 4.5% | 5% |
| No. Coats | 2, 4 | 4 | 1-4 | 1-4 | 4 | 4 | 2-4 | 2-4 | 2-4 | 0, 2-4 | 4 |
| Curing | 140° C. 1 h | 140° C. 2 h | 140° C. 4 h | 100° C. 3 h | none | 140° C. 30 min | 140° C. 1 h | 140° C. 2 h | 140° C. 3 h | 100° C. 4 h | 140° C. 4 h |

TABLE 3

| API:PVA Ratio | 1:1 w/w | 1:1 w/w | 1:1 w/w | 1:1.35 w/w | 1:1 w/w | 1:1 w/w | 1:1 w/w | 1:1.35 w/w | 1:1 w/w | 1:1 w/w | 1:1 w/w | 1:1.35 w/w |
|---|---|---|---|---|---|---|---|---|---|---|---|---|
| Core PVA Soln. | 4.5% | 6.5% | 9% | 9% | 4.5% | 6.5% | 9% | 9% | 4.5% | 6.5% | 9% | 9% |
| No. Coats | | | | | No coating | | | | | | | |
| Curing | 140° C. 30 min | 140° C. 30 min | 140° C. 30 min | 140° C. 30 min | 140° C. 1 h | 140° C. 1 h | 140° C. 1 h | 140° C. 1 h | 140° C. 4 h | 140° C. 4 h | 140° C. 4 h | 140° C. 4 h |

To form films a 4.5% solution of PVA in water was cast by pouring into a tray and air drying at room temperature. When the films were dry, the films were cut into 1×1 square samples. Six samples of each film were then cured at 100° C. for 3 hours, 140° C. for 30 minutes or 140° C. for 4 hours, as described in the table below. After the sample film squares were cured, they were weighed and imaged. Then each sample was immersed in PBS for 24 hours at room tem- Inserts were manufactured by mixing vorolanib with a solution of 78,000/98% PVA in water in the w/w vorolanib: PVA solution ratio specified in the tables above. The mixture was then extruded from a 20, 21 or 23-gauge dispensing tip and dried at room temperature.

For inserts that were coated, the extrudate was then dip-coated in a 78,000/98% PVA solution and air dried. The process of dip-coating was repeated to achieve the number of coatings specified in the table above. The coating process involved dipping the extrudates in the PVA solution with 5 min room temperature drying between the first layers and then at least 10 min of drying time before dipping to form the last layer/coat. The coated extrudates were then cured as described in the table. After cooling to ambient temperature, the extrudates were cut into 2 mm, 3.5 mm, 5 mm or 6 mm or 8 mm long inserts.

Example 2B

The drug release rate of the inserts was tested in vitro. Each insert sample was placed in a 10 mL glass tube, and 5 mL PBS is added to the tube. The tube was incubated in a water bath at 37° C. Samples of the release medium were taken at 12 to 24 hour intervals, and the release medium was replaced with fresh PBS. The amount of vorolanib released was measured quantitatively by HPLC according to the method described in Example 2C. The in vitro release rate was tested, and the average release rate was determined from the cumulative release versus time.

Example 2C

Samples of the inserts were assayed for API content. The inserts tested for content were cut into 4 pieces and all 4 pieces were placed in a labeled scintillation vial. 3.0 mL of methanol was pipetted into the vial, and the vial was placed under a cabinet. This procedure was repeated for all samples. The sample vials were placed in a sonicator, an appropriate amount of water was added, and the samples were sonicated for 30 minutes. Sonication was repeated 5 more times, with the sonicator cooled between each sonication. Extra sonication can be done as needed to ensure the API is completely dissolved. HPLC was performed with the following parameters: Column: ZORBAX Eclipse XDB-C18; 4.6×150 mm; 5-micron; Mobile Phase A: Water+0.1% phosphoric acid; Mobile Phase B: Acetonitrile+0.1% phosphoric acid; Gradient Method; Stop time 30 min; UV: 214 nm.

Example 2D

Erosion of sample inserts was evaluated. A sample insert was placed in a 10 mL glass vial with 5 mL phosphate buffered saline (PBS), and the vial was incubated at 37° C., without stirring. The PBS in the vial was replaced once every 24 hours for each day of the time period of interest. At the end of the period, the sample was removed from the vial, weighed and photographed.

Figure 4A:
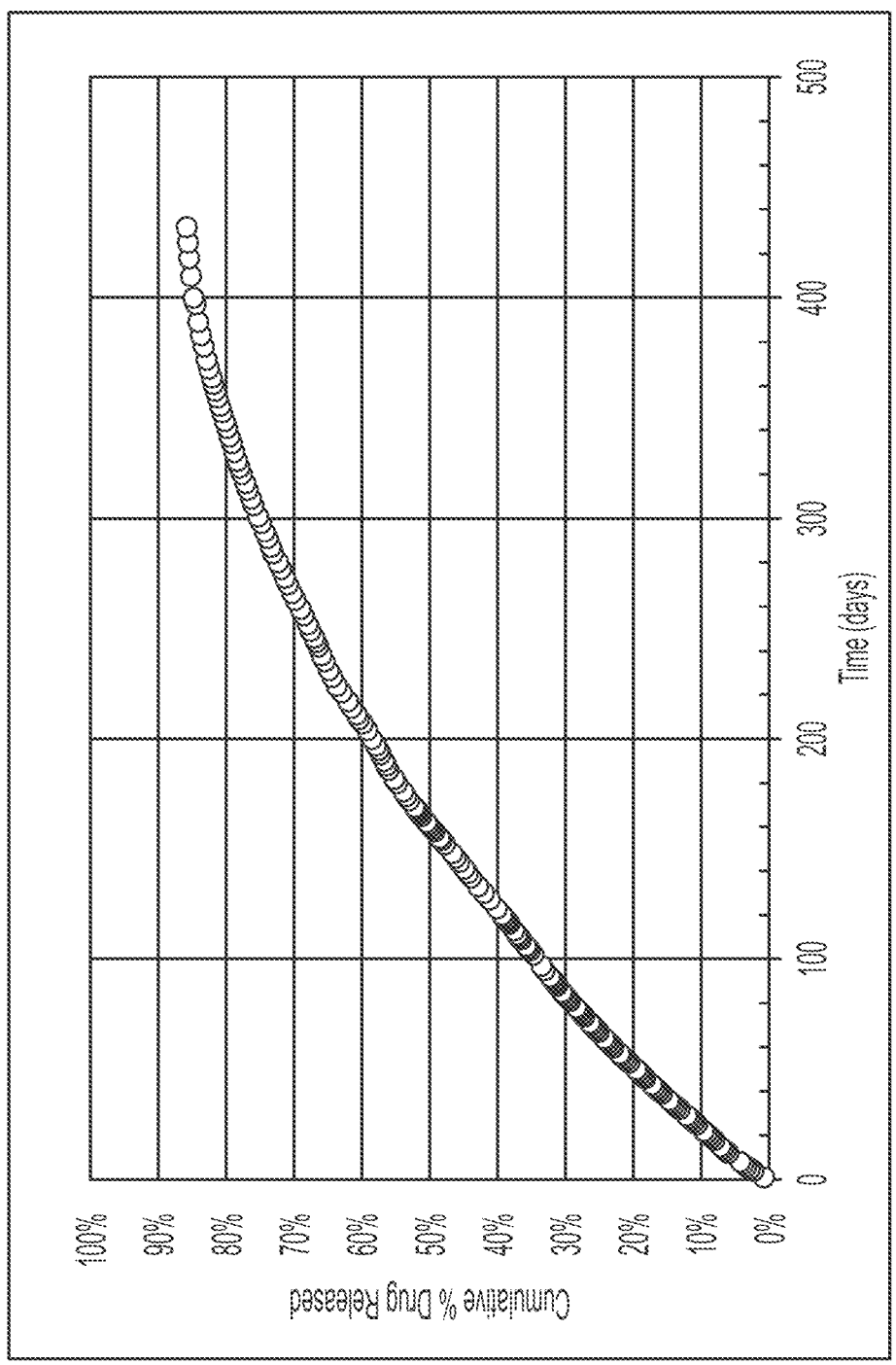
FIG. 4A depicts the in vitro drug release profile showing cumulative percent drug release from a Formulation A implant, which is a coated formulation cured at 140° C. for 4 hours.
Figure 4B:
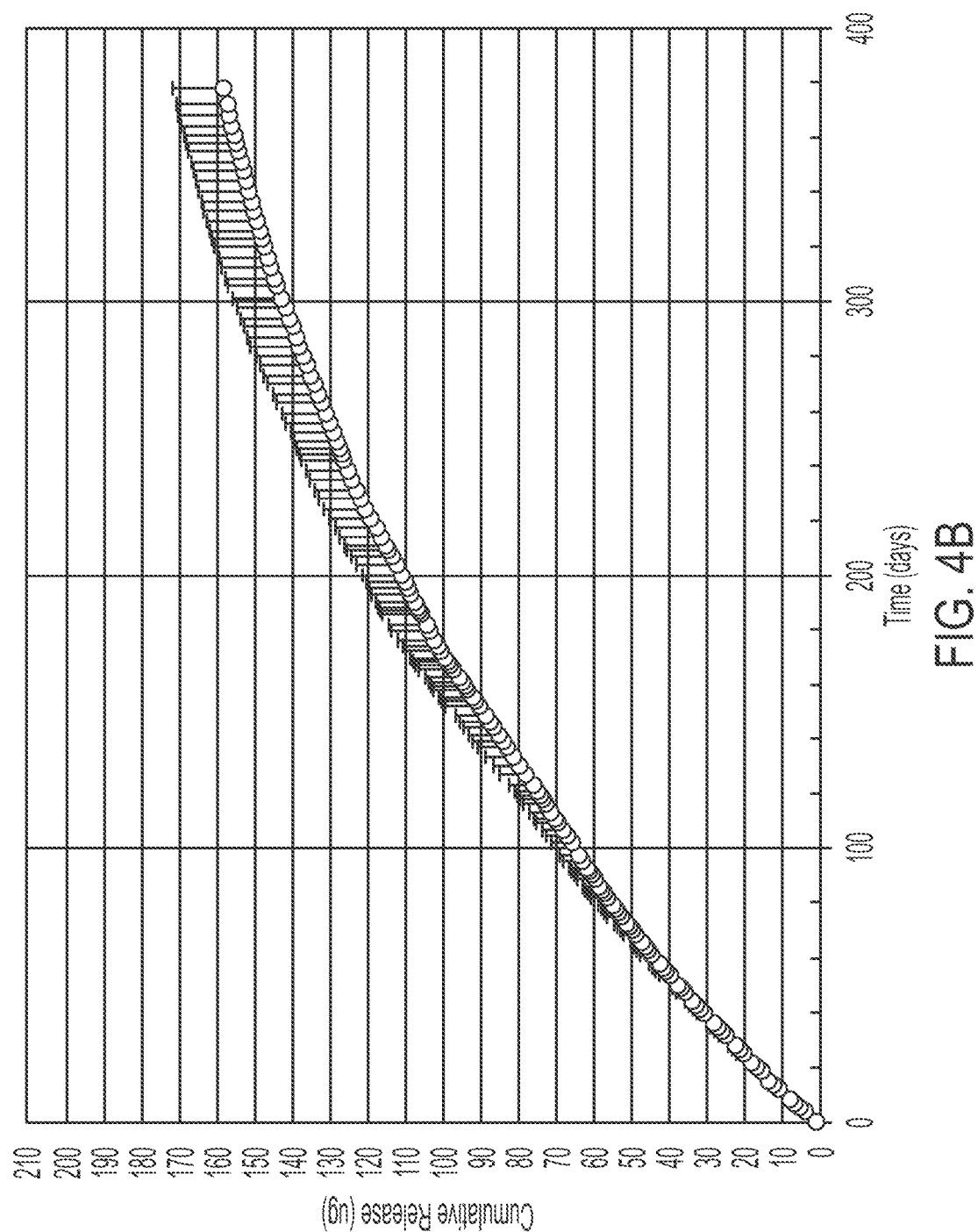
FIG. 4B depicts the in vitro drug release profile showing cumulative amount (μg) of drug released from a Formulation A implant.
Figure 5:
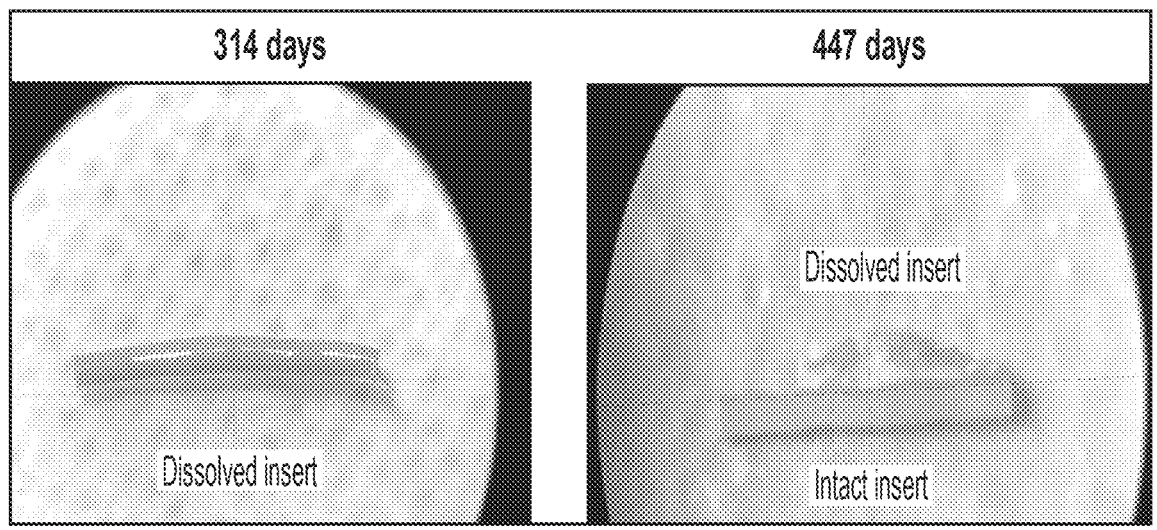
FIG. 5 shows photographs of eroded Formulation A implants taken after immersion in dissolution medium for 314 and 447 days, and the photo of the 447 day implant includes an intact implant for comparison.
Figure 6:
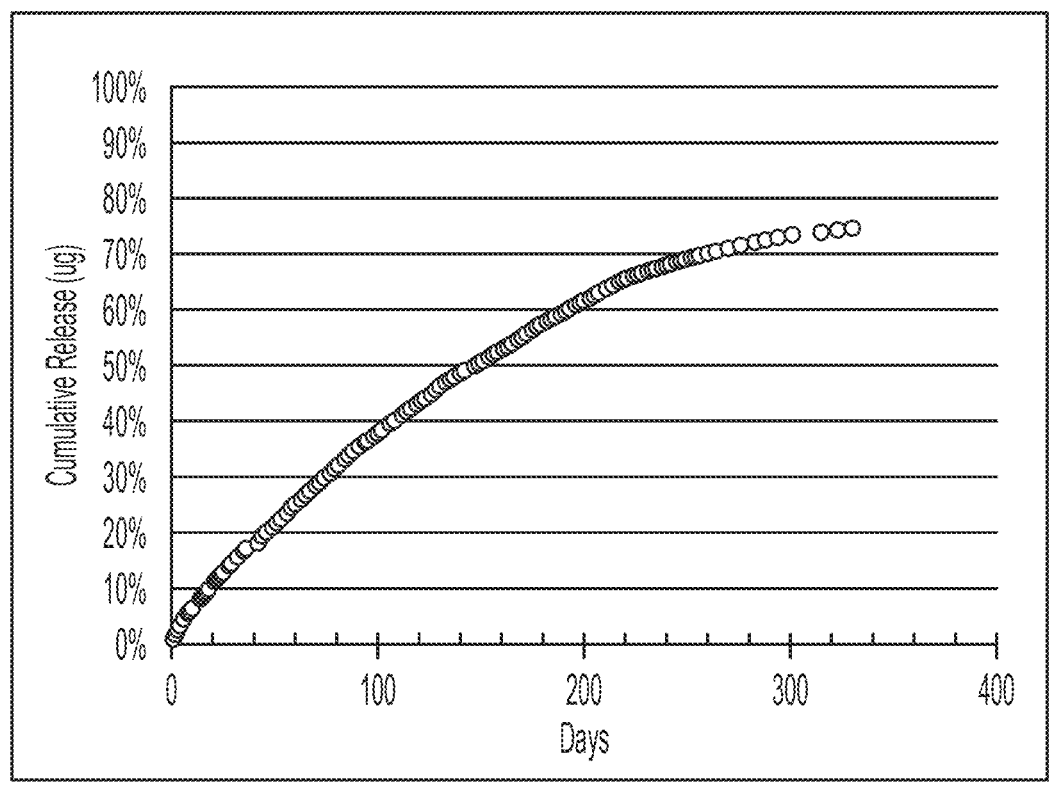
FIG. 6 depicts the in vitro drug release profile for an Uncoated Formulation A implant, which is the same as Formulation A but without a coating.
Figure 7:
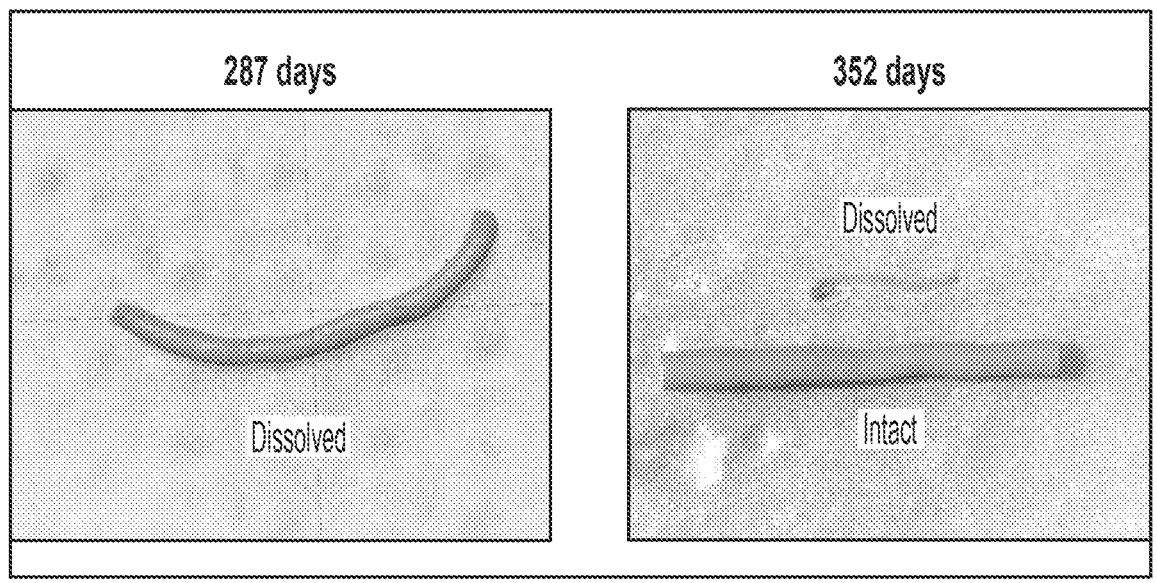
FIG. 7 shows photographs of eroded Uncoated Formulation A implants taken after immersion in dissolution medium for 287 and 352 days, and the photo of the 352 day implant includes an intact implant for comparison.

Drug release rate curves for a coated 4.5% PVA formulation cured at 140° C. for 4 hours, referred to as Formulation A, are shown in FIGS. 4A (cumulative % drug release) and 4B (cumulative drug release (µg)). The drug release rate curve for an Uncoated Formulation A implant is shown in FIG. 6. Photographs of eroded Formulation A implants taken after immersion in dissolution medium for 314 and 447 days is shown in FIG. 5. An intact implant is included in the 447 day photograph for comparison. Photographs of eroded Uncoated Formulation A implants taken after immersion in dissolution medium for 287 and 352 days is shown in FIG. 7. An intact implant is included in the 352 day photograph for comparison.

Figure 8A:
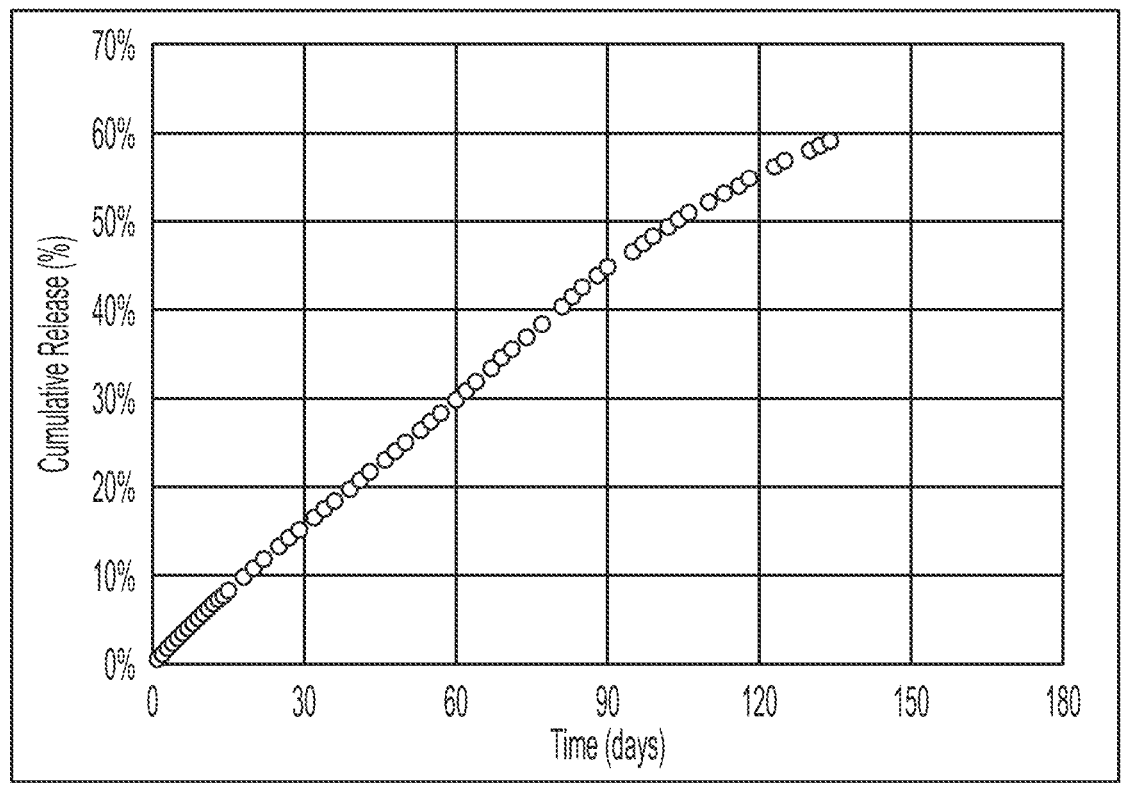
FIG. 8A depicts the in vitro drug release profile showing cumulative percent drug release from a Formulation B implant, which is a coated formulation cured at 140° C./30 minutes.
Figure 8B:
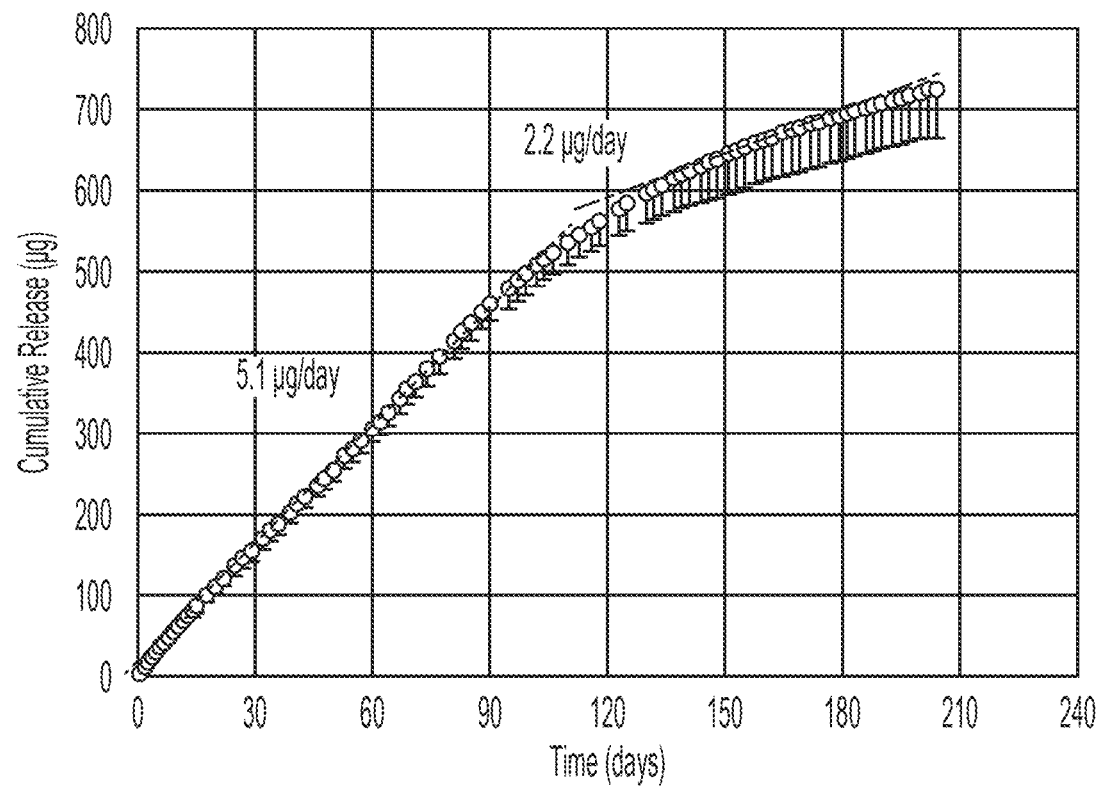
FIG. 8B depicts the in vitro drug release profile showing cumulative amount (μg) drug release from a Formulation B implant.
Figure 9:
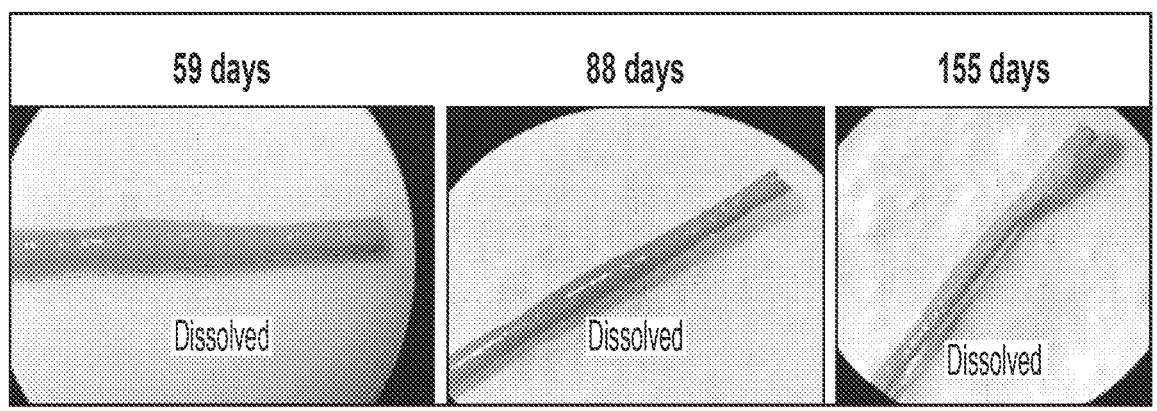
FIG. 9 shows photographs of eroded Formulation B implants taken after immersion in dissolution medium for 59, 88 and 155 days.

Drug release rate curves for a coated 4.5% PVA formulation cured at 140° C. for 30 minutes, referred to as Formulation B, are shown in FIGS. 8 (cumulative % drug release) and 8B (cumulative drug release (µg)). Photographs of eroded Formulation B implants taken after immersion in dissolution medium for 59, 88 and 155 days are shown in FIG. 9.

Figure 10:
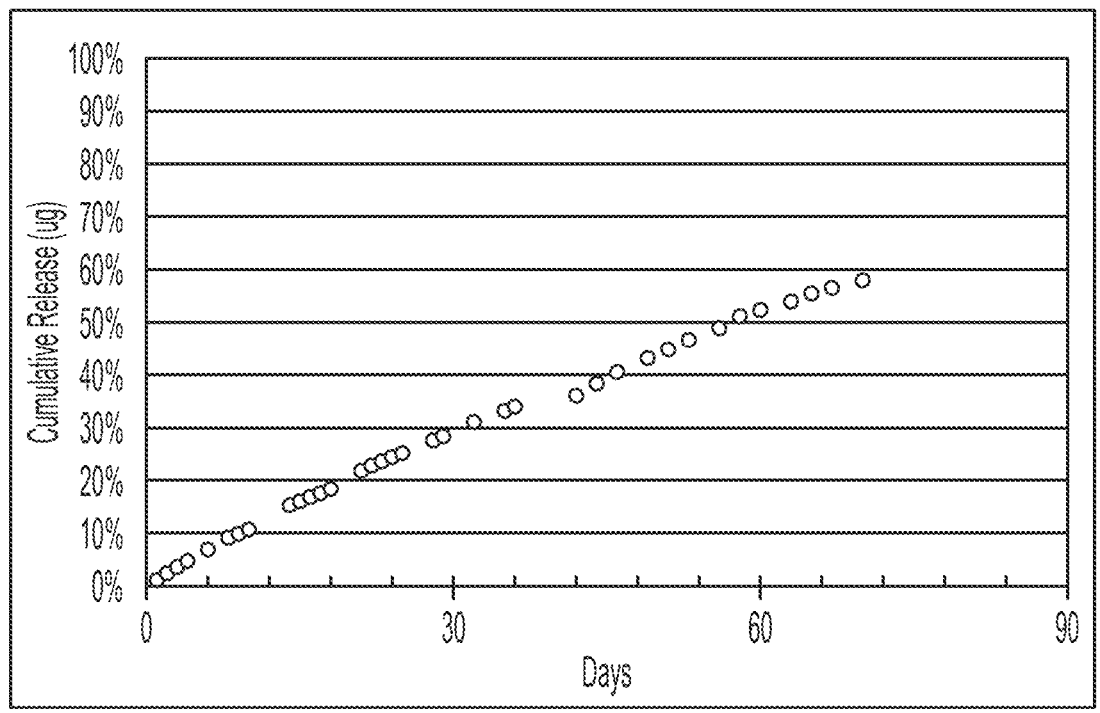
FIG. 10 depicts the in vitro drug release profile for Formulation C, an uncured coated formulation.
Figure 11:
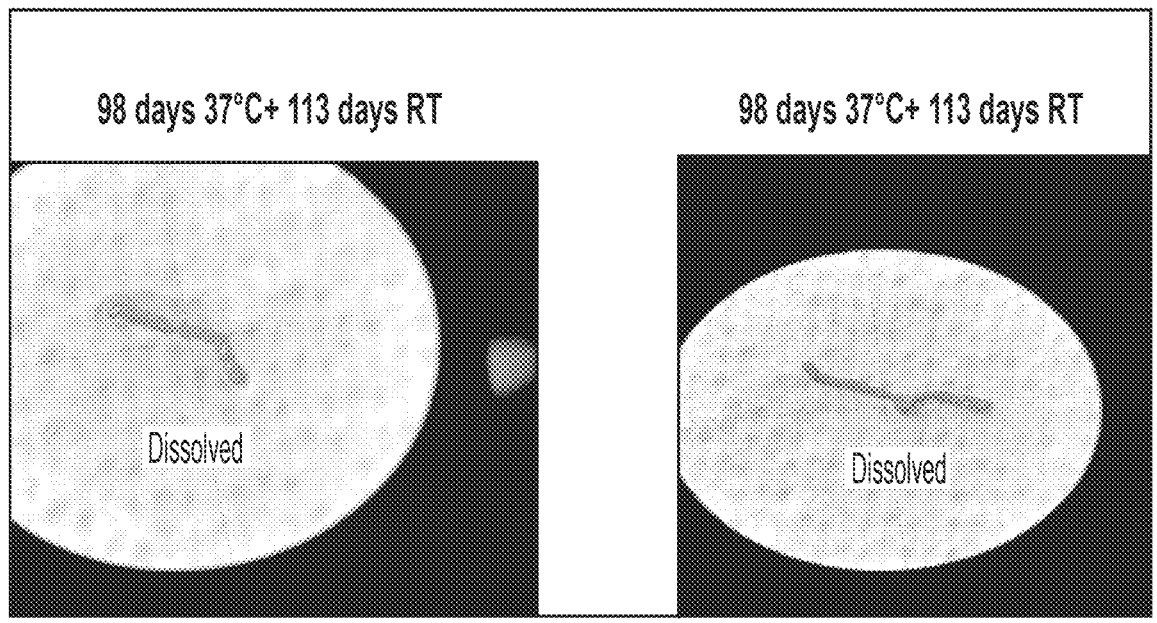
FIG. 11 shows photographs of two samples of eroded Formulation C implants taken after immersion in dissolution medium for 98 days at 37° C. then 113 days at room temperature.

The drug release rate curve for an uncured coated 4.5% PVA formulation, referred to as Formulation C, is shown in FIG. 10. Two photographs each showing a different sample of an eroded Formulation C implant taken after immersion in dissolution medium for 98 days at 37° C. then 113 days at room temperature are shown in FIG. 11.

Figure 12:
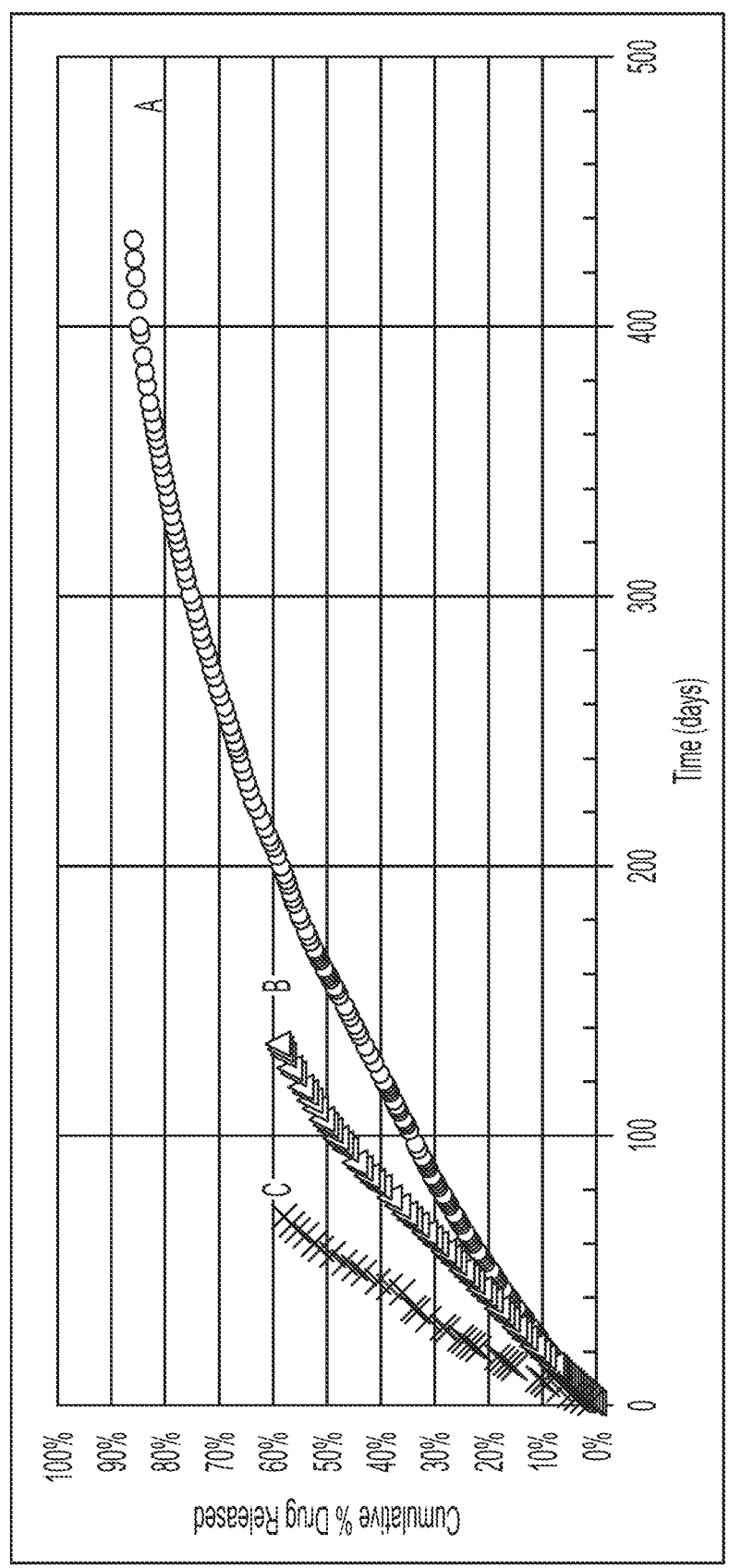
FIG. 12 depicts a comparison of the in vitro drug release profiles for Formulations A, B and C.

A comparison of the drug release curves for Formulations A, B and C is shown in FIG. 12.

Formulation A releases drug more slowly and erodes more slowly than Formulations B and C. Formulation C releases drug more quickly and erodes more quickly than Formulations A and B.

Example 3

Inserts comprising more than one grade of PVA were made according to the parameters in the following table:

TABLE 4

| Core PVA Solution | 4.5% 78K/98% | 4.5% 78K/98% | 4.5% 78K/98% | 4.5% solution mixture of 9:1 78K/98% and 125K/88% | 4.5% solution mixture of 9:1 78K/98% and 125K/88% |
|---|---|---|---|---|---|
| Coat PVA Solution | Coat: 4.5% 78K/98% | Coat 1: 4.5% 78K/98% Coats 2-4: 4.5% 78K/88% | Coat: 4.5% 125K/88% | Coat: 4.5% 78K/98% | Coat: 4.5% 125K/88% |
| Curing | samples of each formulation were cured at 140° C./30 min samples of each formulation were cured at 140° C./1 h samples of each formulation were cured at 140° C./4 h | | | | |

Inserts were manufactured by mixing vorolanib with a solution of PVA in water in a 1:1 w/w vorolanib:PVA solution ratio to form a paste. The mixture was then extruded from a 21 gauge dispensing tip to form approximately 4-5 inch long rods and dried at room temperature. The extrudate rods were cured as described in the table above.

The extrudates were dip-coated in a solution of PVA in water and allowed to dry at room temperature. For inserts with more than one coat, the coating process involved dipping the extrudates in the PVA solution with 5 min room temperature drying between the first layers and then at least 10 min of drying time before dipping to form the last layer/coat.

After the last coat, the coated rods were cured according to the conditions described in the table above. After cooling to ambient temperature, the coated rods were cut into 8 mm long inserts using a razor blade.

API release was measured according to the method described in Example 2B.

API content was measured according to the method described in Example 2C.

Implant erosion was evaluated according to the method described in Example 2D.

Inserts comprising more than one grade of PVA are made according to the parameters in the following tables:

TABLE 5

| Core PVA Solution | 4.0% 78K/99+% | 4.5% 78K/99+% | 4.0% 89K-98K 99+% | 4.0% solution mixture of 9:1 78K/98% and 125K/88% | 4.0% solution mixture of 9:1 78K/98% and 125K/88% |
|---|---|---|---|---|---|
| Coat PVA Solution | Coat: 4.5% 78K/88% | Coat: 4.5% 78K/88% | Coat: 4.5% 78K/98% | Coat: 4.5% 78K/98% | Coat: 4.5% 125K/88% |
| Curing | samples of each formulation were cured at 140° C./30 min samples of each formulation were cured at 140° C./1 h samples of each formulation were cured at 140° C./4 h | | | | |

TABLE 6

| Core PVA Solution | 4.5% 78K/98% | 4.5% 78K/99+% | 4.5% 78K/88% | 4.5% solution mixture of 9:1 78K/98% and 125K/88% | 4.5% solution mixture of 9:1 78K/98% and 125K/88% |
|---|---|---|---|---|---|
| Coat PVA Solution | Coat 1: 5.0% 6000/80% | Coats 1-3: 4.5% 78K/98% Coat 4: 5.0% 6000/80% | Coats 1-5: 4.5% 78K/98% Coat 6: 5.0% 6000/80% | Coats 1-2: 4.5% 78K/98% Coat 3: 4.5% 78K/88% | Coat 1: 4.5% 125K/88% Coat 2: 4.5% 6000/80% |
| Curing | samples of each formulation were cured at 140° C./30 min samples of each formulation were cured at 140° C/1 h samples of each formulation were cured at 140° C/4 h | | | | |

Inserts are manufactured by mixing vorolanib with a solution of PVA in water in a 1:1 w/w vorolanib:PVA solution ratio to form a paste. The mixture is then extruded from a 21 gauge dispensing tip to form approximately 4-5 inch long rods and dried at room temperature. The extrudate rods are cured as described in the tables above.

The extrudates are dip-coated in a solution of PVA in water and allowed to dry at room temperature. For inserts with more than one coat, the coating process involves dipping the extrudates in the PVA solution with 5 min room temperature drying between the first layers and then at least 10 min of drying time before dipping to form the last layer/coat.

After the last coat, the coated rods are cured according to the conditions described in the table above. After cooling to ambient temperature, the coated rods are cut into 8 mm long inserts using a razor blade.

API release is measured according to the method described in Example 2B.

API content is measured according to the method described in Example 2C.

Implant erosion is evaluated according to the method described in Example 2D.

Example 4

Inserts are made according to the parameters in the following tables:

TABLE 7

| API | Vorolanib | | | | | | | | | |
|---|---|---|---|---|---|---|---|---|---|---|
| API:PVA | 1:1 w/w | | | | | | | | | |
| Core PVA Solution | 2.5% | 2.5% | 2.5% | 2.5% | 3% | 3% | 3% | 3% | 5% | 5% |

TABLE 7-continued

| Coat PVA Solution | 4.5% | 4.5% | 5% | 5% | 5% | 5% | 5% | 5% | 5% | 5% |
|---|---|---|---|---|---|---|---|---|---|---|
| No. Coats | 2-4 | 2-4 | 1-4 | 1-4 | 0-4 | 0-4 | 0-4 | 0-4 | 1-4 | 0-4 |
| Curing | after coating 140° C. 2 h | after coating 140° C. 4 h | after coating 140° C. 4 h | before coating 140° C. 4 h | after coating 150° C. 30 min | after coating 140° C. 2 h | after coating 140° C. 3 h | after coating 140° C. 4 h | after coating 150° C. 30 min | after coating 140° C. 2 h |

TABLE 8

| API | Vorolanib | | | | | | | | | |
|---|---|---|---|---|---|---|---|---|---|---|
| API:PVA | 1:1 w/w | | | | | | | | | |
| Core PVA Solution | 5% | 5% | 4% | 4% | 4% | 5% | 5% | 8% | 10% | 12% |
| Coat PVA Solution | 6% | 6% | 8% | 8% | 10% | 8% | 8% | 4.5% | 4% | 4% |
| No. Coats | 1-4 | 1-4 | 1-4 | 1-4 | 1-4 | 1-4 | 1-4 | 0-4 | 0-4 | 0-4 |
| Curing | after coating 140° C. 2 h | after coating 140° C. 4 h | after coating 140° C. 4 h | before coating 140° C. 4 h | after coating 140° C. 30 min | after coating 140° C. 2 h | before coating 140° C. 3 h | after coating 140° C. 2 h | after coating 140° C. 30 min | after coating 140° C. 2 h |

TABLE 9

| API | Axitinib | | | | | | | | | |
|---|---|---|---|---|---|---|---|---|---|---|
| API:PVA | 1:1.5 | 1:1.5 | 1:1.5 | 1:1.5 | 1:2 | 1:2 | 1:2 | 1:2 | 1:2 | 1:2 |
| Core PVA Solution | 3% | 5% | 8% | 10% | 3% | 5% | 5% | 8% | 10% | 10% |
| Coat PVA Solution | 6% | 6% | 6% | 6% | 5% | 5% | 5% | 5% | 5% | 5% |
| No. Coats | 0-4 | 0-4 | 0-4 | 0-4 | 0-4 | 0-4 | 0-4 | 0-4 | 0-4 | 0-4 |
| Curing | after coating 140° C. 2 h | after coating 140° C. 2 h | after coating 140° C. 3 h | before coating 140° C. 2 h | after coating 140° C. 2 h | after coating 140° C. 30 min | before coating 140° C. 2 h | after coating 140° C. 2 h | after coating 140° C. 30 min | after coating 140° C. 2 h |

The API is mixed with a solution of PVA in water in the API:PVA solution ratio specified in the table to form a paste. The paste is extruded through a dispensing tip with a gauge of 20-23 to form approximately 4-5 inch long rods and dried at room temperature. The extrudate rods are cured before or after coating as described in the tables above.

The extrudates are dip-coated in a solution of PVA in water. The coating process involves dipping the extrudates in the PVA solution with 5 min room temperature drying between the first layers and then at least 10 min of drying time before dipping to form the last layer/coat. After the last coat, the coated rods either cured according to the tables above or allowed to dry for 24 hours at room temperature.

The coated rods are cut into 2 mm, 3.5 mm, 5 mm or 6 mm long inserts using a razor blade.

API release is measured according to the method described in Example 2B.

API content is measured according to the method described in Example 2C.

Implant erosion is evaluated according to the method described in Example 2D.

Example 5-Pharmacokinetics Study

An Intravitreal Pharmacokinetic Study was performed in Male Dutch Belted Rabbits. The objective of this study was to characterize the plasma and ocular tissue pharmacokinetics of a vorolanib insert following bilateral intravitreal injection on Day 1. Animals were evaluated up to 24 months following placement of the intravitreal insert.

The table below describes the group assignment dose levels and treatments.

TABLE 10

| | Treatment | |
|---|---|---|
| Group | OD (Rt. Eye) | OS (Lft. Eye) |
| Group 1 Low Dose | 3 inserts | 3 inserts |
| Group 2 High Dose | 6 inserts | 6 inserts |

After administration of anesthesia, vorolanib inserts measuring 0.37 mm in diameter by 3.5 mm in length designed to release drug for at least 6 months were injected, using an injector, intravitreally into each eye of 52 male Dutch-belted rabbits. The low dose group (1) received 3 inserts per eye for a total dose of 630 μg per eye. The high dose group (2) animals received 6 inserts per eye given in 2 separate injections (3 inserts per injection) for a total dose of 1,260 μg per eye.

Prior to each scheduled sacrifice point, one whole blood sample was collected from a targeted 2 animals per group via puncture of a marginal ear vein. Samples were tested for levels of vorolanib and its metabolite. Two animals per group were euthanized on day 1 at 6, 12, 24 and 48 hours, on days 7 and 14, and at 1, 2, 4, 6, 8, 16 and 24 months. Vitreous humor and ocular tissues were collected from both eyes for analysis of ocular tissue drug distribution, inserts were collected, and samples of liver and kidney were collected for evaluation of tissue distribution.

Results: At steady state, the vitreous level of vorolanib was 56 ng/mL for the low dose of 630 µg, and 97 ng/mL for the high dose of 1,260 µg (~dose proportionality). Retina/choroid levels were 49 ng/g and 89 ng/g. There was a burst period of drug release in the first 90 days, followed by steady state. Steady state was reached by day 105. The maximum observed concentrations in vitreous and retina/choroid appear to be nearly dose-proportional. No apparent change was found in plasma levels after 99 days. Through day 180, the vitreous $C_{max}$ was 232 ng/mL, $T_{max}$ was 336 h, and $AUC_{last}$ was 315.5 µg h/mL for the 630 µg dose. Through day 180, the vitreous $C_{max}$ was 1697 ng/mL, $T_{max}$ was 720 h, and $AUC_{last}$ was 1583.2 µg h/mL for the 1260 µg dose.

Figure 13A:
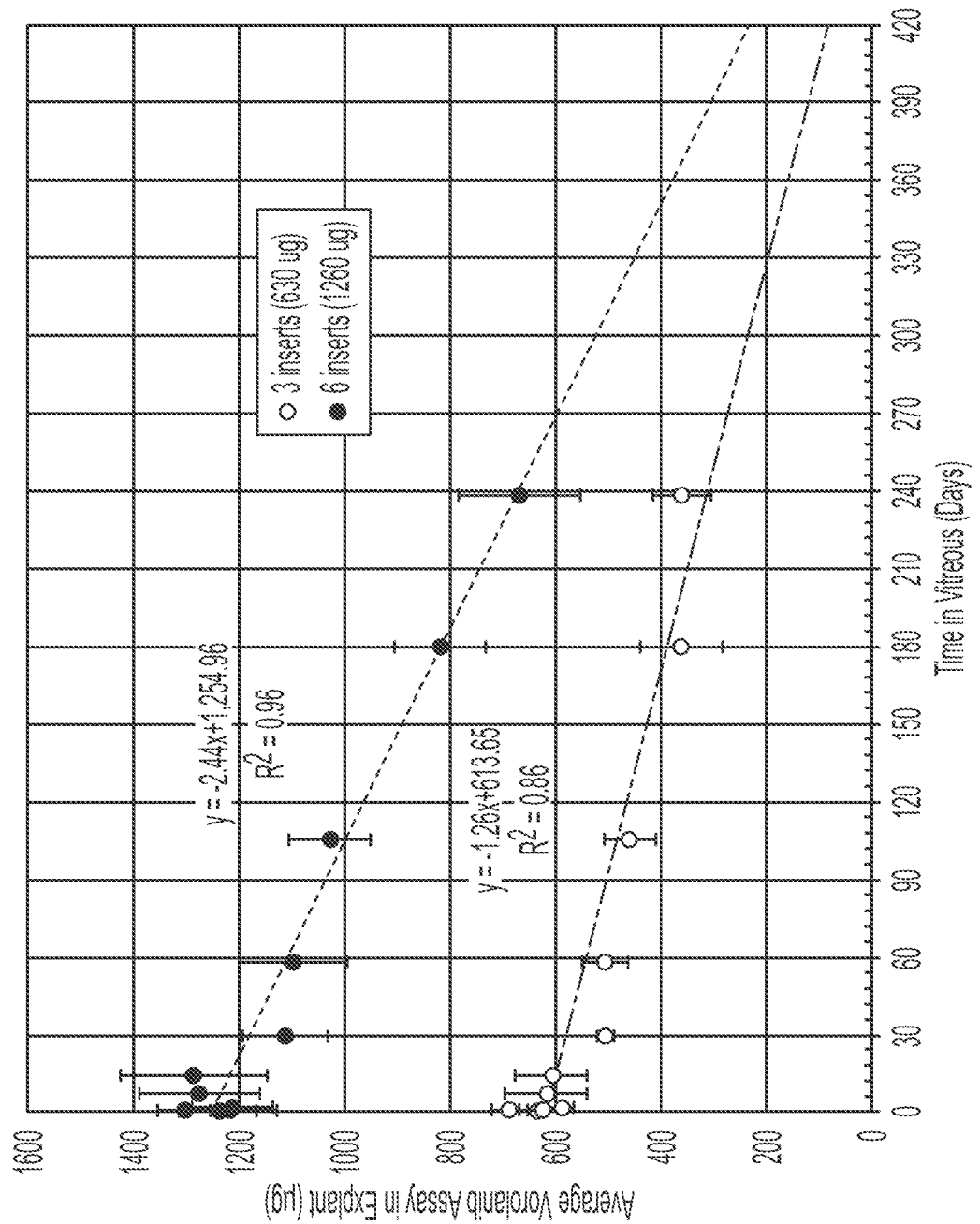
FIG. 13A depicts average amount of drug remaining in an insert versus time for an in vivo study in which inserts that had been implanted in rabbit eyes were explanted at various time points and assayed to determine the amount (μg) of vorolanib remaining in the insert. One curve shows levels for inserts from eyes in which 3 inserts were implanted, and the other shows levels for inserts from eyes in which 6 inserts were implanted.
Figure 13B:
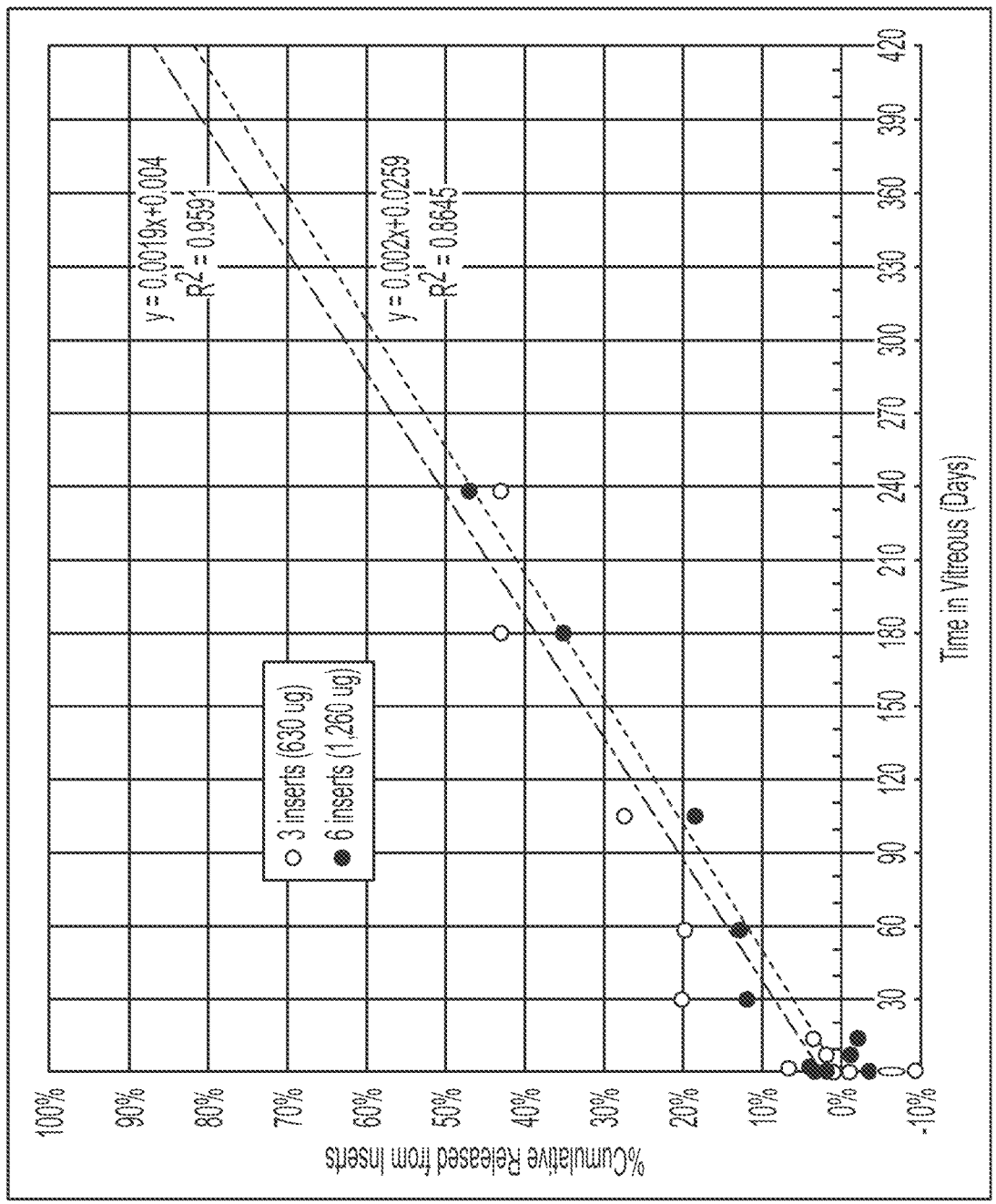
FIG. 13B depicts cumulative percent of drug released versus time for explanted inserts from the same in vivo study. One curve shows levels for inserts from eyes in which 3 inserts were implanted, and the other shows levels for inserts from eyes in which 6 inserts were implanted.

FIG. 13A depicts average amount of drug remaining in an insert versus time for inserts explanted at various time points and assayed to determine the amount of vorolanib remaining in the insert. FIG. 13B depicts cumulative percent of drug released versus time for explanted inserts.

Example 6-Toxicology and Pharmacokinetics Study

An 18 month intravitreal toxicity study for the insert was also performed in 80 Dutch Belted rabbits (40 male and 40 female). Animals were evaluated for a period of 6 and 18 months following placement of intravitreal inserts. The objective was to characterize the ocular toxicity, plasma pharmacokinetics and biodegradation of a vorolanib insert following bilateral intravitreal injection.

The tables below describe the group assignments and dose levels. For the toxicology groups, animals were sacrificed at 6 months and 18 months. For the plasma pharmacokinetic analysis, blood samples were collected at Days 1, 3, and 7 and then 1, 2, 3, 4, 5, 6, 12, 14, 16 and 18 Months

TABLE 11

| Group | Treatment | |
|---|---|---|
| | OD (Rt. Eye) | OS (Lft. Eye) |
| Group 1 Control | 2 placebo inserts | 2 placebo inserts |
| Group 2 Low Dose | 2 inserts | 2 inserts |
| Group 3 Mid Dose | 3 inserts | 3 inserts |
| Group 4 High Dose | 4 inserts | 4 inserts |
| Group 5 Highest Dose | 6 inserts | 6 inserts |

After administration of anesthesia, vorolanib inserts measuring 0.37 mm in diameter by 3.5 mm in length designed to release drug for at least 6 months were injected, using an injector, intravitreally into each eye of each Dutch-belted rabbit. The placebo group (1) animals received two placebo inserts by injection in each eye. The low dose group (2) animals received 2 inserts in each eye. The mid dose group (3) animals received 3 inserts in each eye given in 2 separate injections. The high dose group (4) animals received 4 inserts in each eye given in 2 separate injections (2 inserts/injection). The highest dose group (5) animals received 6 inserts in each eye given in 2 separate injections (3 inserts/injection).

At each scheduled timepoint, whole blood was collected via puncture of a marginal ear vein. Samples were analyzed for clinical pathology and plasma pharmacokinetics. Animals were euthanized according to the schedules described above. A complete gross necropsy was performed on all animals that were sacrificed or found dead during the study. Organs were weighed and tissues collected. Ocular tissues were collected for histopathology only.

Conclusions: The plasma pharmacokinetic and toxicology studies provide evidence of safety at vitreous $C_{max}$ and AUC over an 18 and 24 month period of exposure, respectively. In addition, at the time points tested, vorolanib levels in the vitreous and the retina/choroid remained significantly above the $IC_{50}$ for VEGFR.

No adverse findings were attributed to vorolanib and there were no adverse findings for up to 6 inserts. The no observed adverse effect level (NOAEL) for the inserts was determined to be 6 inserts/eye (1260 µg/eye).

The highest observed event is yellow discoloration of the lens, which appears to be dose related and due to API color. There were no histopathological/microscopic findings associated with lens discoloration. The second highest observed event is focal, punctuate or linear lens opacity and appears to be related mostly to the number of injections and, to a lesser degree, the number of inserts.

Mild inflammation (<2+ aqueous or vitreous cells) was observed across all groups initially. All inflammatory cells had gradually resolved and cleared by 3 months. The highest observed events for inflammation were seen in the placebo group (2 inserts w no drug).

There was no change in intraocular pressure (IOP) from baseline, although some transient changes were observed.

vorolanib plasma levels were in the low pg/mL range.

Example 7—Safety and Efficacy

Safety and efficacy of a vorolanib insert were evaluated in a Swine (Mini-pig) Model of Laser-Induced Choroidal Neovascularization (CNV). The primary objective of this study was to evaluate the long-term safety and inhibition of vascular permeability and neovascularization in a laser-induced model of choroidal neovascularization (CNV) using a vorolanib insert in swine.

The experimental design is described in the following table:

TABLE 12

| Group | Test Article & Dose | Volume/Route | CNF Laser/Dosing Day | Experimental Endpoint | Euthanasia |
|---|---|---|---|---|---|
| 1 | Aflibercept (2 mg) | 50 µL/eye IVT | OU: CNV laser (D0) | OEs: Baseline, prior to laser, and Days 7, 14, and 28. Fluorescein Angiography: Day 7, 14, and 28. Histology: Collect eyes for potential histological examination | Day 28 |
| 2 | Low dose | 1 insert/eye IVT | | | |
| 3 | High dose | 2 inserts/eye IVT | | | |
| 4 | Placebo | 2 inserts/eye IVT | | | |
| 5 | High dose | 2 inserts/eye IVT | None | OEs: Baseline, prior to laser, and Days 7, 14, 28, 56 and 84. ERGs: Baseline, prior to necropsy Histology: Collect eyes for histological examination | Day 84 |
| 6 | Placebo | 2 inserts/eye IVT | | | |

On the day of lasering (Groups 1-4) animals were treated with an 810 nm diode laser delivered through an indirect ophthalmoscope. Approximately 6 single laser spots were placed between retinal veins. Both eyes underwent laser treatment according to the schedule in the table above.

On the day of intravitreal injections animals were anesthetized and the eyes were aseptically prepared. The conjunctiva was gently grasped with colibri forceps, and the injection (25G injector needle) was made 2-3 mm posterior to the superior limbus (through the pars plana), with the needle directly slightly posteriorly to avoid contact with the lens. Animals were allowed to recover normally from the procedure. The pigs were given a topical drop of antibiotic ophthalmic solution 4-6 hours later, and then BID for 2 additional days with at least 6 hours between doses. Animals were dosed on either Day 0 immediately following laser CNV induction or 7 days prior to laser CNV induction according to the schedule in the table above. Animals in Groups 5-6 did not undergo laser CNV procedures and were implanted on Day 0.

During acclimation, and while on study, the animals were evaluated for mortality and morbidity as well as general health, with particular attention to the eyes. Body weights were taken prior to treatment and prior to necropsy, animals in Groups 5 & 6 were weighed monthly.

Complete ocular examination (OE) (modified Hackett and McDonald) using a slit lamp biomicroscope and indirect ophthalmoscope to evaluate ocular surface morphology, anterior segment and posterior segment inflammation, cataract formation, and retinal changes was conducted by a veterinary ophthalmologist at the timepoints as indicated in the experimental design table. Mydriasis for ocular examination was done using topical 1% tropicamide HCL.

Flourescein Angiography was done in both eyes in anesthetized animals at the timepoints as indicated in the experimental design table.

Full-field electroretinography (ERG) was done on both eyes of the animals at baseline and 3 months following dosing (Groups 5-6 only). On the day of ERG measurements, animals were anesthetized following dark adaptation. ERGs were elicited by brief flashes at 0.33 Hz delivered with a mini-ganzfeld photostimulator at maximal intensity. Twenty responses were amplified, filtered, and averaged for each animal. Animals underwent standard ERG measurements as dictated by ISCEV standards, including scotopic (0.01 candela), scotopic (3 candela), and photopic (25 candela) measurements.

At time points indicated by the experimental design table, following final data collections, animals were euthanized. Histology was evaluated for eyes from Groups 5-6.

Results: Overall, dose-related efficacy was found and there was no clinically observed toxicity. Fluorescein angiography analysis in all groups (1-4) had a reduced Corrected Total Lesion Fluorescence (CTLF) value from Day 7 to Day 28, with aflibercept treated animals having the largest reduction in CTLF values, followed by high dose, and the remaining groups having similar reductions in CTLF values. ERG b-wave amplitudes were reduced from baseline to Day 84 in both groups undergoing ERGs; however, this may be attributed to difficulties in ERG acquisition.

Eyes undergoing histological examinations displayed some inflammation, which may have been more severe in animals dosed with high dose implants. The implant procedure may have contributed to the increased inflammation observed in the high dose group.

Aflibercept and placebo implants performed as expected, with aflibercept having normal amounts of efficacy in this model, and placebo implants being well tolerated.

CONCLUSIONS

Vorolanib plasma levels in the PK study were in the low pg/mL range. Dose-related efficacy was found and there was no clinically observed toxicity. Thus, the inserts of the invention were able to deliver safe and therapeutically effective steady state levels of vorolanib locally over a sustained period, while resulting in only negligible systemic levels of vorolanib. Moreover, the inserts are fully bioerodible.

What is claimed is:

1. An ocular drug delivery insert consisting of a solid matrix core comprising a matrix polymer and vorolanib or a pharmaceutically acceptable salt thereof, wherein the amount of the vorolanib or pharmaceutically acceptable salt thereof in the insert is about 75% w/w to about 98% w/w, wherein the matrix polymer is polyvinyl alcohol, wherein the drug release rate for the insert is about 0.1 µg/day to about 20 µg/day and is substantially constant for at least about 14 days, and wherein the duration of drug release is at least about 12 weeks.

2. The ocular drug delivery insert of claim 1, wherein the amount of the vorolanib or pharmaceutically acceptable salt thereof in the insert is about 800 µg to about 2000 µg.

3. The ocular drug delivery insert of claim 1, wherein the insert is sized and shaped to fit through a cannula or needle of 20 gauge or smaller.

4. The ocular drug delivery insert of claim 3, wherein the insert is rod shaped and has a length of about 6 mm to 10 mm.

5. The ocular drug delivery insert of claim 1, wherein the amount of matrix polymer in the core is about 4% w/w to about 25% w/w.

6. The ocular drug delivery insert of claim 1, wherein the amount of matrix polymer in the core is about 1% w/w to about 10% w/w.

7. The ocular drug delivery insert of claim 1, wherein the duration of drug release is at least about 18 weeks.

8. An ocular drug delivery insert consisting of (a) a solid matrix core comprising polyvinyl alcohol and vorolanib or a pharmaceutically acceptable salt thereof, and (b) a coating comprising polyvinyl alcohol substantially surrounding the core, wherein the amount of the vorolanib or pharmaceutically acceptable salt thereof in the insert is about 75% w/w to about 98% w/w, wherein the drug release rate for the insert is about 0.1 µg/day to about 20 µg/day, and wherein the duration of drug release is at least about 12 weeks.

9. The ocular drug delivery insert of claim 8, wherein the amount of the vorolanib or pharmaceutically acceptable salt thereof in the insert is about 800 µg to about 2000 µg.

10. The ocular drug delivery insert of claim 8, wherein the insert is sized and shaped to fit through a cannula or needle of 20 gauge or smaller.

11. The ocular drug delivery insert of claim 8, wherein the insert is rod shaped and has a length of about 6 mm to 10 mm.

12. The ocular drug delivery insert of claim 8, wherein the amount of matrix polymer in the core is about 4% w/w to about 25% w/w.

13. The ocular drug delivery insert of claim 8, wherein the amount of matrix polymer in the core is about 1% w/w to about 10% w/w.

14. The ocular drug delivery insert of claim 8, wherein the duration of drug release is at least about 18 weeks.

* * * * *